United States Patent
Wang

(10) Patent No.: US 11,831,425 B2
(45) Date of Patent: Nov. 28, 2023

(54) CHANNEL BLIND DETECTION METHOD, SIGNAL TRANSMISSION METHOD AND RELATED DEVICES

(71) Applicant: CHINA ACADEMY OF TELECOMMUNICATIONS TECHNOLOGY, Beijing (CN)

(72) Inventor: Lei Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 116 days.

(21) Appl. No.: 16/982,995

(22) PCT Filed: Mar. 14, 2019

(86) PCT No.: PCT/CN2019/078131
§ 371 (c)(1),
(2) Date: Sep. 21, 2020

(87) PCT Pub. No.: WO2019/192304
PCT Pub. Date: Oct. 10, 2019

(65) Prior Publication Data
US 2021/0028883 A1 Jan. 28, 2021

(30) Foreign Application Priority Data
Apr. 3, 2018 (CN) .......................... 201810288575.6
May 11, 2018 (CN) .......................... 201810448324.X

(51) Int. Cl.
*H04L 1/00* (2006.01)
*H04W 24/08* (2009.01)
(Continued)

(52) U.S. Cl.
CPC .......... *H04L 1/0038* (2013.01); *H04L 1/0052* (2013.01); *H04W 24/08* (2013.01);
(Continued)

(58) Field of Classification Search
CPC ..................................................... H04L 1/0038
See application file for complete search history.

(56) References Cited

U.S. PATENT DOCUMENTS

| 2012/0190395 A1 | 7/2012 | Pan et al. |
| 2015/0110055 A1 | 4/2015 | Lv et al. |
(Continued)

FOREIGN PATENT DOCUMENTS

| CN | 101932024 A | 12/2010 |
| CN | 102014494 A | 4/2011 |
(Continued)

OTHER PUBLICATIONS

Etri, "PDCCH design for multi-beam operation", R1-1720231, 3GPP TSG RAN WG1 Meeting #91, Reno, USA, Nov. 27-Dec. 1, 2017, all pages.
(Continued)

*Primary Examiner* — Abdeltif Ajid
(74) *Attorney, Agent, or Firm* — Ladas & Parry, LLP

(57) ABSTRACT

The present disclosure provides a channel blind detection method, a signal transmission method and related devices. The channel blind detection method includes, when the quantity of times of blind detection to be performed by a terminal side device within a specific time-domain range exceeds a maximum blind detection capability, skipping, by the terminal side device, a part of blind detection occasions within the specific time-domain range, and performing channel blind detection in the remaining blind detection occasions. The maximum blind detection capability is the maximum quantity of times of blind detection performed by the terminal side device within the specific time-domain range, and the remaining quantity of times of blind detection to be performed by the terminal side device within the specific time-domain range does not exceed the maximum blind
(Continued)

detection capability. According to the present disclosure, it is able to improve performance of the terminal side device.

20 Claims, 8 Drawing Sheets

(51) Int. Cl.
*H04W 72/0446* (2023.01)
*H04W 72/23* (2023.01)
*H04W 72/53* (2023.01)

(52) U.S. Cl.
CPC ....... *H04W 72/0446* (2013.01); *H04W 72/23* (2023.01); *H04W 72/53* (2023.01)

(56) References Cited

U.S. PATENT DOCUMENTS

| | | | |
|---|---|---|---|
| 2016/0205614 A1 | 7/2016 | Ma et al. | |
| 2017/0374569 A1 | 12/2017 | Lee et al. | |
| 2019/0215098 A1* | 7/2019 | Tiirola | H04L 25/0238 |
| 2019/0223164 A1* | 7/2019 | He | H04L 25/0204 |
| 2019/0335425 A1* | 10/2019 | Seo | H04L 5/0053 |
| 2020/0213837 A1* | 7/2020 | Pan | H04L 1/0038 |
| 2020/0221428 A1* | 7/2020 | Moon | H04L 1/1854 |
| 2021/0067268 A1* | 3/2021 | Seo | H04L 1/0052 |

FOREIGN PATENT DOCUMENTS

| | | |
|---|---|---|
| CN | 102123524 A | 7/2011 |
| CN | 103636271 A | 3/2014 |
| CN | 104737605 A | 6/2015 |
| CN | 104936206 A | 9/2015 |
| CN | 109121159 A | 1/2019 |
| JP | 2018506246 A | 3/2018 |
| TW | 1521987 B | 2/2016 |
| WO | 2014000309 A1 | 1/2014 |
| WO | 2015039351 A1 | 3/2015 |

OTHER PUBLICATIONS

Notice of Reason for Refusal from corresponding JP app. No. 2020-551424, dated Oct. 26, 2021, with English translation from Global Dossier, all pages.
Extended European Search Report from EP app. No. 19780611.0, dated Apr. 1, 2021.
"UE procedure of PDCCH monitoring for URLLC", R1-1719405, 3GPP TSG RAN WG1 NR Meeting #91, Reno, USA, Nov. 27-Dec. 1, 2017.
"Summary of remaining issues on PDCCH monitoring with TP", R1-1801338, 3GPP TSG RAN WG1 Meeting #92, Athens, Greece, Feb. 26-Mar. 2, 2018.
"Remaining issues on PDCCH search space", R1-1803751, 3GPP TSG RAN WG1 Meeting #92bis, Sanya, China, Apr. 16 -20, 2018.
First Office Action and Search Report from CN app. No. 201810448324. X, dated Mar. 26, 2020, with English translation provided by Global Dossier.
Second Office Action and search report from CN app. No. 201810448324.X, dated Oct. 22, 2020, with English translation provided by Global Dossier.
First Office Action and search report from TW app. No. 108110255, dated Feb. 5, 2021, with machine English translation.
International Search Report from PCT/CN2019/078131, dated May 30, 2019, with English translation provided by WIPO.
Written Opinion of the International Searching Authority from PCT/CN2019/078131, dated May 30, 2019, with English translation provided by WIPO.
International Preliminary Report on Patentability from PCT/CN2019/078131, dated Oct. 6, 2020, with English translation provided by WIPO.
"Discussion of search space design", R1-1715686, 3GPP TSG RAN WG1 Meeting NR#3, Nagoya, Japan, Sep. 18-21, 2017.
"On reducing the PDCCH channel estimation and BD complexity in NR", R1-1800550, 3GPP TSG RAN WG1 Ad Hoc 1801, Vancouver, Canada, Jan. 22-26, 2018.
"Remaining details on PDCCH search space", R1-1801531, 3GPP TSG RAN WG1 Meeting #92, Athens, Greece, Feb. 26-Mar. 2, 2018.
"Search space design and related issues", R1-1801622, 3GPP TSG RAN WG1 Meeting #92, Athens, Greece, Feb. 26-Mar. 2, 2018.
"Remaining issues on Search Space", R1-1802115, 3GPP TSG RAN WG1 Meeting #92, Athens, Greece, Feb. 26-Mar. 2, 2018.
"Remaining issues on control resource set and search space", R1-1802834, 3GPP TSG RAN WG1 Meeting #92, Athens, Greece, Feb. 26-Mar. 2, 2018.

* cited by examiner

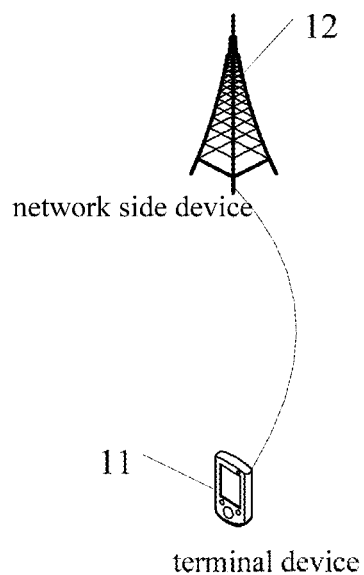

network side device terminal device

FIG. 1 when the quantity of times of blind detection to be performed by a terminal side device within a specific time-domain range exceeds a maximum blind detection capability, skipping, by the terminal side device, a part of blind detection occasions within the specific time-domain range, and performing channel blind detection in the remaining blind detection occasions — 201

FIG. 2

CHANNEL BLIND DETECTION METHOD, SIGNAL TRANSMISSION METHOD AND RELATED DEVICES

CROSS-REFERENCE TO RELATED APPLICATIONS

The present application is the U.S. national phase of PCT Application No. PCT/CN2019/078131 filed on Mar. 14, 2019, which claims priorities of the Chinese patent application No. 201810288575.6 filed on Apr. 3, 2018 and the Chinese patent application No. 201810448324.X filed on May 11, 2018, the disclosures of which are incorporated herein by reference in their entities.

TECHNICAL FIELD

The present disclosure relates to the field of communication technology, in particular to a channel blind detection method, a signal transmission method and related devices.

BACKGROUND

In a future wireless mobile communications system, a plurality of search spaces is configured by a network side device for a terminal, and different search spaces have a same monitoring period or different monitoring periods. In addition, such performance as blocking probability and link adaptation is directly affected by the quantity of Physical Downlink Control Channel (PDCCH) candidates included in each search space, so it is necessary to configure a certain quantity of PDCCH candidates. However, in actual use, a blind detection capability of the terminal in a time-domain resource (e.g., slot) is limited. In order to ensure the transmission flexibility, a certain quantity of PDCCH candidates needs to be configured within each search space, and at this time, the quantity of times of blind detection to be performed by the terminal in the time-domain resource may exceed a maximum blind detection capability of the terminal in the time-domain resource, so the performance of the terminal may deteriorate.

SUMMARY

An object of the present disclosure is to provide a channel blind detection method, a signal transmission method and related devices, so as to improve the performance of a terminal side device.

In one aspect, the present disclosure provides in some embodiments a channel blind detection method, including, when the quantity of times of blind detection to be performed by a terminal side device within a specific time-domain range exceeds a maximum blind detection capability, skipping, by the terminal side device, a part of blind detection occasions within the specific time-domain range, and performing channel blind detection in the remaining blind detection occasions. The maximum blind detection capability is the maximum quantity of times of blind detection performed by the terminal side device within the specific time-domain range, and the remaining quantity of times of blind detection to be performed by the terminal side device within the specific time-domain range does not exceed the maximum blind detection capability.

In a possible embodiment of the present disclosure, the skipping, by the terminal side device, a part of blind detection occasions within the specific time-domain range and performing the channel blind detection in the remaining blind detection occasions includes at least one of: skipping, by the terminal side device, a part of PDCCH candidates in at least one Aggregation Level (AL) in search spaces within the specific time-domain range, and performing the channel blind detection on the remaining PDCCH candidates; skipping, by the terminal side device, a part of search spaces within the specific time-domain range, and performing the channel blind detection in the remaining search spaces; or skipping, by the terminal side device, search spaces in a part of Control Resource Sets (CORESETs) within the specific time-domain range, and performing the channel blind detection in search spaces in the remaining CORESETs.

In a possible embodiment of the present disclosure, a plurality of PDCCH monitoring occasions or a plurality of search space types is provided within the specific time-domain range. The skipping, by the terminal side device, a part of the search spaces within the specific time-domain range includes: continuously skipping, by the terminal side device, search spaces in a part of the PDCCH monitoring occasions within the specific time-domain range in accordance with a chronological order of the monitoring occasions; or skipping at intervals, by the terminal side device, the search spaces in a part of the PDCCH monitoring occasions within the specific time-domain range in accordance with the chronological order of the monitoring occasions.

In a possible embodiment of the present disclosure, the skipping at intervals, by the terminal side device, the search spaces in a part of the PDCCH monitoring occasions within the specific time-domain range in accordance with the chronological order of the monitoring occasions includes: selecting at intervals, by the terminal side device, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of Control Channel Elements (CCEs) for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device skips the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions includes: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the skipping, by the terminal side device, the part of PDCCH candidates in at least one AL in the search spaces within the specific time-domain range includes: when there is a plurality of PDCCH candidates at each AL in each search space within the specific time-domain range, skipping, by the terminal side device, a part of PDCCH candidates at each AL in each search space within the specific time-domain range sequentially until the quantity of times of blind detection to be performed within the specific time-domain range does not exceed the maximum blind detection capability; or when there is an AL with merely one PDCCH candidate in the specific time-domain range, skipping, by the terminal side device, a part of PDCCH candidates at the other AL5 in each search space within the specific time-domain range, the other ALs being ALs each with a plurality of PDCCH candidates; or skipping, by the terminal side device, a part of PDCCH candidates at the ALs in each search space within the specific time-domain range in accordance with a specific order of the ALs until the quantity of times of blind detection to be performed by the terminal side device within the specific time-domain range does not exceed the maximum blind detection capability. In a procedure of skipping the PDCCH candidates, with respect to an AL with merely one PDCCH candidate left, the terminal side device stops skipping the PDCCH candidate at the AL.

In a possible embodiment of the present disclosure, the terminal side device skips the PDCCH candidates in accordance with an order of the search space, the monitoring occasion and the AL until the remaining quantity of times of blind detection to be performed within the specific time-domain range does not exceed the maximum blind detection capability.

In a possible embodiment of the present disclosure, the skipping, by the terminal side device, the part of search spaces within the specific time-domain range includes: skipping, by the terminal side device, the part of search spaces within the specific time-domain range in accordance with a size of a monitoring period; or skipping, by the terminal side device, the part of search spaces within the specific time-domain range in accordance with a Radio Network Temporary Identity (RNTI); or skipping, by the terminal side device, UE-specific Search Spaces (USSs) in a specific CORESET, the specific CORESET being a CORESET for transmitting Common Search Spaces (CSSs).

In a possible embodiment of the present disclosure, the skipping, by the terminal side device, the search spaces in a part of CORESETs within the specific time-domain range includes: skipping, by the terminal side device, the search spaces in a part of CORESETs within the specific time-domain in accordance with a mapping mode; or skipping, by the terminal side device, search spaces in a specific CORESET within the specific time-domain range preferentially, the specific CORESET being a CORESET in a plurality of CORESETs whose Quasi-Colocation (QCL) matches target QCL at a lowest matching level within the specific time-domain range, the target QCL being QCL acquired through beam management.

In a possible embodiment of the present disclosure, the skipping, by the terminal side device, the search spaces in a part of CORESETs within the specific time-domain range in accordance with the mapping mode includes: skipping, by the terminal side device, search spaces in localized mapping CORESETs within the specific time-domain range preferentially; or skipping, by the terminal side device, search spaces in distributed-mapping CORESETs within the specific time-domain range preferentially.

In a possible embodiment of the present disclosure, the specific time-domain range is a slot.

In another aspect, the present disclosure provides in some embodiments a signal transmission method, including: when the quantity of times of blind detection to be performed by a terminal side device within a specific time-domain range exceeds a maximum blind detection capability, determining, by a network side device, a part of blind detection occasions skipped by the terminal side device within the specific time-domain range, the maximum blind detection capability being a maximum quantity of times of blind detection performed by the terminal side device within the specific time-domain range; and transmitting, by the network side device, signals in the remaining blind detection occasions. The remaining quantity of times of blind detection to be performed by the terminal side device within the specific time-domain range does not exceed the maximum blind detection capability.

In a possible embodiment of the present disclosure, the determining, by the network side device, the part of blind detection occasions to be skipped by the terminal side device within the specific time-domain range includes at least one of: determining, by the network side device, a part of PDCCH candidates in at least one AL in search spaces skipped by the terminal side device within the specific time-domain range; determining, by the network side device, a part of search spaces skipped by the terminal side device within the specific time-domain range; or determining, by the network side device, search spaces in a part of CORESETs skipped by the terminal side device within the specific time-domain range.

In a possible embodiment of the present disclosure, a plurality of PDCCH monitoring occasions or a plurality of search space types is provided within the specific time-domain range. The determining, by the network side device, a part of search spaces skipped by the terminal side device within the specific time-domain range includes: determining, by the network side device, search spaces in a part of the PDCCH monitoring occasions continuously skipped by the terminal side device within the specific time-domain range in accordance with a chronological order of the monitoring occasions; or determining, by the network side device, the search spaces in a part of the PDCCH monitoring occasions skipped by the terminal side device at intervals within the specific time-domain range in accordance with the chronological order of the monitoring occasions.

In a possible embodiment of the present disclosure, the determining, by the network side device, the search spaces in a part of the PDCCH monitoring occasions skipped by the terminal side device at intervals within the specific time-domain range in accordance with the chronological order of the monitoring occasions includes: selecting, by the network side device at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device skips the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions includes: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the determining, by the network side device, a part of PDCCH candidates in at least one AL in the search spaces skipped by the terminal side device within the specific time-domain range includes: when there is a plurality of PDCCH candidates at each AL in each search space within the specific time-domain range, determining, by the network side device, a part of PDCCH candidates at each AL in each search space skipped by the terminal side device within the specific time-domain range sequentially; or when there is an AL with merely one PDCCH candidate in the specific time-domain range, determining, by the network side device, a part of PDCCH candidates at the other ALs in each search space skipped by the terminal side device within the specific time-domain range, the other ALs being ALs each with a plurality of PDCCH candidates; or determining, by the network side device, a part of PDCCH candidates at the ALs in each search space skipped by the terminal side device within the specific time-domain range in accordance with a specific order of the ALs. In a procedure of skipping the PDCCH candidates, with respect to an AL with merely one PDCCH candidate left, the terminal side device stops skipping the PDCCH candidate at the AL.

In a possible embodiment of the present disclosure, the terminal side device skips the PDCCH candidates in accordance with an order of the search space, the monitoring occasion and the AL until the remaining quantity of times of blind detection to be performed within the specific time-domain range does not exceed the maximum blind detection capability.

In a possible embodiment of the present disclosure, the determining, by the network side device, a part of search spaces skipped by the terminal side device within the specific time-domain range includes: determining, by the network side device, the part of search spaces skipped by the terminal side device within the specific time-domain range in accordance with a size of a monitoring period; or determining, by the network side device, the part of search spaces skipped by the terminal side device within the specific time-domain range in accordance with an RNTI; or determining, by the network side device, USSs skipped by the terminal side device in a specific CORESET, the specific CORESET being a CORESET for transmitting CSSs.

In a possible embodiment of the present disclosure, the determining, by the network side device, the search spaces in a part of CORESETs skipped by the terminal side device within the specific time-domain range includes: determining, by the network side device, the search spaces in a part of CORESETs skipped by the terminal side device within the specific time-domain in accordance with a mapping mode; or determining, by the network side device, search spaces in a specific CORESET skipped preferentially by the terminal side device within the specific time-domain range, the specific CORESET being a CORESET in a plurality of CORESETs whose Quasi-Colocation (QCL) matches target QCL at a lowest matching level within the specific time-domain range, the target QCL being QCL acquired through beam management.

In a possible embodiment of the present disclosure, the determining, by the network side device, the search spaces in the part of CORESETs skipped by the terminal side device within the specific time-domain range in accordance with the mapping mode includes: determining, by the network side device, search spaces in localized mapping CORESETs skipped by the terminal side device preferentially within the specific time-domain range; or determining, by the network side device, search spaces in distributed-mapping CORESETs skipped by the terminal side device preferentially within the specific time-domain range.

In a possible embodiment of the present disclosure, the specific time-domain range is a slot.

In yet another aspect, the present disclosure provides in some embodiments a terminal side device, including a blind detection module configured to, when the quantity of times of blind detection to be performed by a terminal side device within a specific time-domain range exceeds a maximum blind detection capability, skip a part of blind detection occasions within the specific time-domain range, and perform channel blind detection in the remaining blind detection occasions. The maximum blind detection capability is the maximum quantity of times of blind detection performed by the terminal side device within the specific time-domain range, and the remaining quantity of times of blind detection to be performed by the terminal side device within the specific time-domain range does not exceed the maximum blind detection capability.

In a possible embodiment of the present disclosure, the blind detection module includes at least one of: a first blind detection unit configured to, when the quantity of times of blind detection to be performed by the terminal side device within the specific time-domain range exceeds the maximum blind detection capability, skip a part of PDCCH candidates in at least one AL in search spaces within the specific time-domain range, and perform the channel blind detection on the remaining PDCCH candidates; a second blind detection unit configured to, when the quantity of times of blind detection to be performed by the terminal side device within the specific time-domain range exceeds the maximum blind detection capability, skip a part of search spaces within the specific time-domain range, and perform the channel blind detection in the remaining search spaces; or a third blind detection unit configured to, when the quantity of times of blind detection to be performed by the terminal side device within the specific time-domain range exceeds the maximum blind detection capability, skip search spaces in a part of CORESETs within the specific time-domain range, and perform the channel blind detection in search spaces in the remaining CORESETs.

In still yet another aspect, the present disclosure provides in some embodiments a network side device, including: a determination module configured to, when the quantity of times of blind detection to be performed by a terminal side device within a specific time-domain range exceeds a maximum blind detection capability, determine a part of blind detection occasions skipped by the terminal side device within the specific time-domain range, the maximum blind detection capability being a maximum quantity of times of blind detection performed by the terminal side device within the specific time-domain range; and a transmission module configured to transmit signals in the remaining blind detection occasions. The remaining quantity of times of blind detection to be performed by the terminal side device within the specific time-domain range does not exceed the maximum blind detection capability.

In a possible embodiment of the present disclosure, the determination module includes at least one of: a first determination unit configured to, when the quantity of times of blind detection to be performed by the terminal side device within the specific time-domain range exceeds the maximum blind detection capability, determine a part of PDCCH candidates in at least one AL in search spaces skipped by the terminal side device within the specific time-domain range; a second determination unit configured to, when the quantity of times of blind detection to be performed by the terminal side device within the specific time-domain range exceeds the maximum blind detection capability, determine a part of search spaces skipped by the terminal side device within the specific time-domain range; or a third determination unit configured to, when the quantity of times of blind detection to be performed by the terminal side device within the specific time-domain range exceeds the maximum blind detection capability, determine search spaces in a part of CORESETs skipped by the terminal side device within the specific time-domain range.

In still yet another aspect, the present disclosure provides in some embodiments a terminal side device, including a transceiver, a memory, a processor, and a computer program stored in the memory and executed by the processor. The processor is configured to read and execute the computer program stored in the memory, so as to execute a procedure of, when the quantity of times of blind detection to be performed by a terminal side device within a specific time-domain range exceeds a maximum blind detection capability, skipping a part of blind detection occasions within the specific time-domain range, and performing channel blind detection in the remaining blind detection occasions. The maximum blind detection capability is the maximum quantity of times of blind detection performed by the terminal side device within the specific time-domain range, and the remaining quantity of times of blind detection to be performed by the terminal side device within the specific time-domain range does not exceed the maximum blind detection capability.

In a possible embodiment of the present disclosure, the skipping a part of blind detection occasions within the specific time-domain range and performing the channel blind detection in the remaining blind detection occasions includes at least one of: skipping, by the terminal side device, a part of PDCCH candidates in at least one AL in search spaces within the specific time-domain range, and performing the channel blind detection on the remaining PDCCH candidates; skipping a part of search spaces within the specific time-domain range, and performing the channel blind detection in the remaining search spaces; or skipping search spaces in a part of CORESETs within the specific time-domain range, and performing the channel blind detection in search spaces in the remaining CORESETs.

In a possible embodiment of the present disclosure, a plurality of PDCCH monitoring occasions or a plurality of search space types is provided within the specific time-domain range. The skipping a part of the search spaces within the specific time-domain range includes: continuously skipping search spaces in a part of the PDCCH monitoring occasions within the specific time-domain range in accordance with a chronological order of the monitoring occasions; or skipping, at intervals, the search spaces in a part of the PDCCH monitoring occasions within the specific time-domain range in accordance with the chronological order of the monitoring occasions.

In a possible embodiment of the present disclosure, the skipping, at intervals, the search spaces in a part of the PDCCH monitoring occasions within the specific time-domain range in accordance with the chronological order of the monitoring occasions includes: selecting, at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device skips the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions includes: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the skipping the part of PDCCH candidates in at least one AL in the search spaces within the specific time-domain range includes: when there is a plurality of PDCCH candidates at each AL in each search space within the specific time-domain range, skipping a part of PDCCH candidates at each AL in each search space within the specific time-domain range sequentially until the quantity of times of blind detection to be performed within the specific time-domain range does not exceed the maximum blind detection capability; or when there is an AL with merely one PDCCH candidate in the specific time-domain range, skipping a part of PDCCH candidates at the other ALs in each search space within the specific time-domain range, the other ALs being ALs each with a plurality of PDCCH candidates; or skipping a part of PDCCH candidates at the ALs in each search space within the specific time-domain range in accordance with a specific order of the ALs until the quantity of times of blind detection to be performed by the terminal side device within the specific time-domain range does not exceed the maximum blind detection capability. In a procedure of skipping the PDCCH candidates, with respect to an AL with merely one PDCCH candidate left, the terminal side device stops skipping the PDCCH candidate at the AL.

In a possible embodiment of the present disclosure, the skipping the part of search spaces within the specific time-domain range includes: skipping the part of search spaces within the specific time-domain range in accordance with a size of a monitoring period; or skipping the part of search spaces within the specific time-domain range in accordance with an RNTI; or skipping USSs in a specific CORESET, the specific CORESET being a CORESET for transmitting CSSs.

In a possible embodiment of the present disclosure, the skipping the search spaces in a part of CORESETs within the specific time-domain range includes: skipping the search spaces in a part of CORESETs within the specific time-domain in accordance with a mapping mode; or skipping search spaces in a specific CORESET within the specific time-domain range preferentially, the specific CORESET being a CORESET in a plurality of CORESETs whose QCL matches target QCL at a lowest matching level within the specific time-domain range, the target QCL being QCL acquired through beam management.

In still yet another aspect, the present disclosure provides in some embodiments a network side device, including a transceiver, a memory, a processor, and a computer program stored in the memory and executed by the processor. The processor is configured to read and execute the computer program stored in the memory, so as to execute procedures of: when the quantity of times of blind detection to be performed by a terminal side device within a specific time-domain range exceeds a maximum blind detection capability, determining a part of blind detection occasions skipped by the terminal side device within the specific time-domain range, the maximum blind detection capability being a maximum quantity of times of blind detection performed by the terminal side device within the specific time-domain range; and transmitting signals in the remaining blind detection occasions, the remaining quantity of times of blind detection to be performed by the terminal side device within the specific time-domain range not exceeding the maximum blind detection capability.

In a possible embodiment of the present disclosure, the determining the part of blind detection occasions to be skipped by the terminal side device within the specific time-domain range includes at least one of: determining a part of PDCCH candidates in at least one AL in search spaces skipped by the terminal side device within the specific time-domain range; determining a part of search spaces skipped by the terminal side device within the specific time-domain range; or determining search spaces in a part of CORESETs skipped by the terminal side device within the specific time-domain range.

In a possible embodiment of the present disclosure, a plurality of PDCCH monitoring occasions or a plurality of search space types is provided within the specific time-domain range. The determining a part of search spaces skipped by the terminal side device within the specific time-domain range includes: determining search spaces in a part of the PDCCH monitoring occasions continuously skipped by the terminal side device within the specific time-domain range in accordance with a chronological order of the monitoring occasions; or determining the search spaces in a part of the PDCCH monitoring occasions skipped by the terminal side device at intervals within the specific time-domain range in accordance with the chronological order of the monitoring occasions.

In a possible embodiment of the present disclosure, the determining the search spaces in a part of the PDCCH monitoring occasions skipped by the terminal side device at intervals within the specific time-domain range in accordance with the chronological order of the monitoring occasions includes: selecting, at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device skips the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions includes: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the determining a part of PDCCH candidates in at least one AL in the search spaces skipped by the terminal side device within the specific time-domain range includes: when there is a plurality of PDCCH candidates at each AL in each search space within the specific time-domain range, determining a part of PDCCH candidates at each AL in each search space skipped by the terminal side device within the specific time-domain range sequentially; or when there is an AL with merely one PDCCH candidate in the specific time-domain range, determining a part of PDCCH candidates at the other ALs in each search space skipped by the terminal side device within the specific time-domain range, the other ALs being ALs each with a plurality of PDCCH candidates; or determining a part of PDCCH candidates at the ALs in each search space skipped by the terminal side device within the specific time-domain range in accordance with a specific order of the ALs. In a procedure of skipping the PDCCH candidates, with respect to an AL with merely one PDCCH candidate left, the terminal side device stops skipping the PDCCH candidate at the AL.

In a possible embodiment of the present disclosure, the determining a part of search spaces skipped by the terminal side device within the specific time-domain range includes: determining the part of search spaces skipped by the terminal side device within the specific time-domain range in accordance with a size of a monitoring period; or determining the part of search spaces skipped by the terminal side device within the specific time-domain range in accordance with an RNTI; or determining USSs skipped by the terminal side device in a specific CORESET, the specific CORESET being a CORESET for transmitting CSSs.

In a possible embodiment of the present disclosure, the determining the search spaces in a part of CORESETs skipped by the terminal side device within the specific time-domain range includes: determining the search spaces in a part of CORESETs skipped by the terminal side device within the specific time-domain in accordance with a mapping mode; or determining search spaces in a specific CORESET skipped preferentially by the terminal side device within the specific time-domain range, the specific CORESET being a CORESET in a plurality of CORESETs whose QCL matches target QCL at a lowest matching level within the specific time-domain range, the target QCL being QCL acquired through beam management.

In still yet another aspect, the present disclosure provides in some embodiments a computer-readable storage medium storing therein a computer program. The computer program is executed by a processor so as to implement the above-mentioned channel blind detection method or the above-mentioned signal transmission method.

According to the embodiments of the present disclosure, when the quantity of times of blind detection to be performed by the terminal side device within the specific time-domain range exceeds the maximum blind detection capability, the terminal side device may skip a part of the blind detection occasions within the specific time-domain range, and perform the channel blind detection in the remaining blind detection occasions. The maximum blind detection capability may be the maximum quantity of times of blind detection performed by the terminal side device within the specific time-domain range, and the remaining quantity of times of blind detection to be performed by the terminal side device within the specific time-domain range may not exceed the maximum blind detection capability. Because a part of the blind detection occasions are skipped, the remaining quantity of times of blind detection to be performed by the terminal side device within the specific time-domain range may not exceed the maximum blind detection capability, so it is able to improve the performance of the terminal side device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 1 is a schematic view showing an applicable network according to one embodiment of the present disclosure;

FIG. 2 is a flow chart of a channel blind detection method according to one embodiment of the present disclosure;

DETAILED DESCRIPTION

Figure 3:
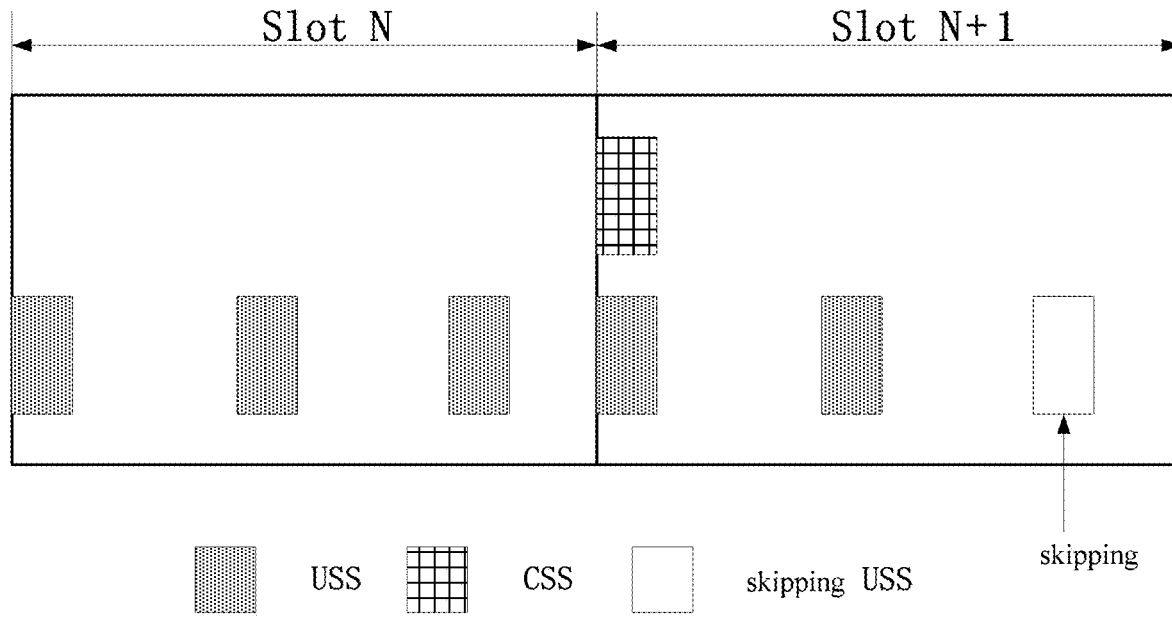
FIG. 3 is a schematic view showing a situation where a blind detection occasion is skipped according to one embodiment of the present disclosure.

In order to make the objects, the technical solutions and the advantages of the present disclosure more apparent, the present disclosure will be described hereinafter in a clear and complete manner in conjunction with the drawings and embodiments.

FIG. 1 shows an applicable network according to one embodiment of the present disclosure. As shown in FIG. 1, the network includes a terminal side device 11 and a network side device 12. The terminal side device 11 may a User Equipment (UE) or any other terminal device, e.g., a mobile phone, a tablet personal computer, a laptop computer, a Personal Digital Assistant (PDA), a Mobile Internet Device (MID) or a wearable device. It should be appreciated that, the types of the terminal side device 11 will not be particularly defined herein. The terminal side device 11 may communicate with the network side device 12. The network side device 12 may be a base station, e.g., macro base station, Long Term Evolution (LTE) evolved Node B (eNB), or 5th-Generation (5G) New Radio (NR) NB. The network side device 12 may also be a micro base station (e.g., Low Power Node (LPN), pico base station, or femto base station), or an Access Point (AP). The base station may also be a network node consisting of a Central Unit (CU) and a plurality of Transmission Reception Points (TRPs) managed and controlled by the CU. It should be appreciated that, the types of the network side device 12 will not be particularly defined herein.

The present disclosure provides in some embodiments a channel blind detection method which, as shown in FIG. 2, includes Step 201 of, when the quantity of times of blind detection to be performed by a terminal side device within a specific time-domain range exceeds a maximum blind detection capability, skipping, by the terminal side device, a part of blind detection occasions within the specific time-domain range, and performing channel blind detection in the remaining blind detection occasions. The maximum blind detection capability is the maximum quantity of times of blind detection performed by the terminal side device within the specific time-domain range, and the remaining quantity of times of blind detection to be performed by the terminal side device within the specific time-domain range does not exceed the maximum blind detection capability.

The specific time-domain range may be, e.g., one slot. Of course, it may also be any other time-domain range, e.g., one subframe or a plurality of symbols, which will not be particularly defined herein.

The quantity of times of blind detection to be performed by the terminal side device within the specific time-domain range may be determined in accordance with a configuration within the specific time-domain range, and a specific determination mode will not be particularly defined herein. In addition, the maximum blind detection capability may be preconfigured or defined in a protocol, e.g., 44 or 46. For example, in a USS set 1 configured by a network side device for the terminal side device, there are 0 monitoring occasions within one slot (0=3), and there are 14 PDCCH candidates in a search space set. In addition, a CSS includes 7 PDCCH candidates. When the CSS and the USS occur within a same slot, the total quantity of times of blind detection may be 14*3+7=49. When the maximum blind detection capability is 44, the quantity of times of blind detection to be performed by the terminal side device within the slot, i.e., 49, may be greater than 44, i.e., the quantity of times of blind detection to be performed by the terminal side device may exceed the maximum blind detection capability.

In addition, the skipping a part of blind detection occasions within the specific time-domain range may include skipping at least one of a part of PDCCH candidates or a part of search spaces within the specific time-domain range, so that the remaining quantity of times of blind detection to be performed by the terminal side device within the specific time-domain range does not exceed the maximum blind detection capability. In other words, in the embodiments of the present disclosure, each blind detection occasion may be a resource on which the blind detection needs to be performed by the terminal side device, e.g., a PDCCH candidate or a search space. The remaining blind detection occasions may be blind detection occasions other than those skipped by the terminal side device within the specific time-domain range, e.g., PDCCH candidates and a part of search spaces that are not skipped by the terminal side device.

It should be appreciated that, in the embodiments of the present disclosure, when the remaining quantity of times of blind detection to be performed by the terminal side device within the specific time-domain range does not exceed the maximum blind detection capability, it may be understood as that, apart from the part of blind detection occasions skipped by the terminal side device, the quantity of times of blind detection to be performed by the terminal side device within the specific time-domain range may not exceed the maximum blind detection capability. It may also be understood as that, after a skipping operation, the remaining quantity of times of blind detection to be performed is the remaining quantity of times of blind detection to be performed by the terminal side device within the specific time-domain range. For example, when the quantity of times of blind detection to be performed by the terminal side device within one slot is 49 and the maximum blind detection capability is 44, the terminal side device may skip one monitoring occasions, e.g., the terminal side device may not detect PDCCHs in a blind manner within a third PDCCH monitoring occasion, so the remaining quantity of times of blind detection to be performed by the terminal side device within the slot may be 49−14=35, which is smaller than 44.

It should be appreciated that, in the embodiments of the present disclosure, a sequential relationship between the skipping a part of blind detection occasions within the specific time-domain range and the performing the channel blind detection in the remaining blind detection occasions will not be particularly defined herein. For example, the skipping a part of blind detection occasions within the specific time-domain range may be performed prior to, or subsequent to, the performing the channel blind detection in the remaining blind detection occasions, or they may be performed alternately.

Through the above step, a part of the blind detection occasions may be skipped by the terminal side device within the specific time-domain range, so the remaining quantity of times of blind detection to be performed by the terminal side device within the specific time-domain range may not exceed the maximum blind detection capability, and the terminal side device may perform the channel blind detection in the remaining blind detection occasions. As a result, it is able to improve the performance of the terminal side device. In addition, for a communications system, it is unnecessary to reduce the quantity of PDCCH candidates configured within each search space, so it is able to ensure the performance of the communications system.

In the embodiments of the present disclosure, through the above step, when the quantity of times of blind detection to be performed by the terminal side device within the specific time-domain range (one slot) exceeds the maximum blind detection capability of the terminal side device, the terminal side device may skip a part of blind detection occasions (e.g., blind detection occasions for PDCCH candidates) in accordance with a certain rule, so that the remaining quantity of times of blind detection to be performed by the terminal side device does not exceed the maximum blind detection capability when monitoring a downlink control channel. The rule may be preconfigured by the terminal side device, or predefined in a protocol, or determined by the network side device and the terminal side device through negotiation. How to skip a part of blind detection occasions will be described hereinafter in details in conjunction with the embodiments.

In a possible embodiment of the present disclosure, the skipping, by the terminal side device, a part of blind detection occasions within the specific time-domain range and performing the channel blind detection in the remaining blind detection occasions may include at least one of: skipping, by the terminal side device, a part of PDCCH candidates in at least one AL in search spaces within the specific time-domain range, and performing the channel blind detection on the remaining PDCCH candidates; skipping, by the terminal side device, a part of search spaces within the specific time-domain range, and performing the channel blind detection in the remaining search spaces; or skipping, by the terminal side device, search spaces in a part of CORESETs within the specific time-domain range, and performing the channel blind detection in search spaces in the remaining CORESETs.

The skipping a part of PDCCH candidates at the at least one AL may include selecting a part of, or all of, the ALs, and skipping a part of PDCCH candidates at each AL in the selected ALs, and at this time, it may be ensured that there is at least one PDCCH candidate at each AL which is not skipped. In other words, the part of PDCCH candidates at the at least one AL may include a part of PDCCH candidates at each AL in the at least one AL, i.e., there is at least one PDCCH candidate at each AL which is not skipped. The skipping a part of PDCCH candidates at the at least one AL may further include skipping a part of PDCCH candidates at the at least one AL in each search space, i.e., the PDCCH candidates skipped in each search space may be the same.

During the implementation, the blind detection occasions may be skipped on the basis of the ALs, so it is able to ensure the blind detection performance of the terminal side device while ensuring that the remaining quantity of times of blind detection to be performed by the terminal side device within the specific time-domain range does not exceed the maximum blind detection capability, thereby to enable the terminal side device to perform the blind detection at each AL.

The skipping, by the terminal side device, a part of search spaces within the specific time-domain range may include skipping a part of search spaces in a plurality of search spaces within the specific time-domain range and then performing the blind detection in the remaining search spaces, or skipping search spaces in a part of PDCCH monitoring occasions in a plurality of PDCCH monitoring occasions and then performing the blind detection in search spaces in the remaining PDCCH monitoring occasions.

During the implementation, a part of search spaces may be directly skipped, so it is able to ensure, in a rapid and simple manner, that the quantity of times of blind detection to be performed by the terminal side device within the specific time-domain range does not exceed the maximum blind detection capability without any complex calculation.

The skipping the search spaces in a part of CORESETs within the specific time-domain range may include skipping search spaces in a part of CORESETs in a plurality of CORESETs within the specific time-domain range and performing the blind detection in search spaces in the remaining CORESETs. Identically, during the implementation, it is able to ensure, in a rapid and simple manner, that the quantity of times of blind detection to be performed by the terminal side device within the specific time-domain range does not exceed the maximum blind detection capability without any complex calculation.

It should be appreciated that, during the implementation, it is able to ensure that the quantity of times of blind detection to be performed by the terminal side device within the specific time-domain range does not exceed the maximum blind detection capability through one or more of the above-mentioned modes in accordance with a terminal requirement, a service requirement or a scenario requirement, so as to improve the flexibility.

The description will be illustratively given hereinafter in conjunction with the embodiments.

In a possible embodiment of the present disclosure, a plurality of PDCCH monitoring occasions or a plurality of search space types may be provided within the specific time-domain range. The skipping, by the terminal side device, a part of the search spaces within the specific time-domain range may include: continuously skipping, by the terminal side device, search spaces in a part of the PDCCH monitoring occasions within the specific time-domain range in accordance with a chronological order of the monitoring occasions; or skipping at intervals, by the terminal side device, the search spaces in a part of the PDCCH monitoring occasions within the specific time-domain range in accordance with the chronological order of the monitoring occasions.

In the continuously skipping the search spaces in a part of PDCCH monitoring occasions within the specific time-domain range, the part of PDCCH monitoring occasions that have not been skipped may not include a PDCCH monitoring occasion that has not been skipped. In other words, the part of PDCCH monitoring occasions may include one or more PDCCH monitoring occasions, and when the part of PDCCH monitoring occasions include a plurality of PDCCH monitoring occasions, the plurality of PDCCH monitoring occasions may be temporally separated from each other.

In the skipping at intervals the search spaces in a part of PDCCH monitoring occasions within the specific time-domain range, a part of PDCCH monitoring occasions that have been skipped may be continuous with a PDCCH monitoring occasion that has not been skipped. In other words, the part of PDCCH monitoring occasions may include one or more PDCCH monitoring occasions, and when the part of PDCCH monitoring occasions include a plurality of PDCCH monitoring occasions, the plurality of PDCCH monitoring occasions may be temporally consecutive.

During the implementation, the terminal side device may skip, continuously or at intervals, all PDCCH candidates in a part of search spaces in a part of PDCCH monitoring occasions. For example, when there is a plurality of PDCCH monitoring occasions or various search space types within one slot and the quantity of times of blind detection to be performed by the terminal side device in all the search spaces within the slot exceeds the maximum blind detection capability of the terminal side device, the terminal side device may skip a part of monitoring occasions in accordance with the chronological order of the monitoring occasions. For example, there are N monitoring occasions within the slot and the quantity of times of blind detection to be performed by the terminal side device in first M monitoring occasions reaches (i.e., is equal to) the maximum blind detection capability of the terminal side device, the terminal side device may not continuously perform the blind detection on the PDCCHs in the remaining (N-M) monitoring occasions (i.e., monitoring occasions M+1, M+2, . . . , N).

For another example, when there is a plurality of PDCCH monitoring occasions or various search space types and the quantity of times of blind detection to be performed by the terminal side device in all search spaces within the slot exceeds the maximum blind detection capability of the terminal side device, the terminal side device may skip, at intervals, a part of monitoring occasions in accordance with the chronological order of the monitoring occasions. For instance, when there are 2P monitoring occasions within the slot, the terminal side device may at first skip odd-numbered monitoring occasions until the quantity of times of blind detection to be performed does not exceed the maximum blind detection capability of the terminal side device.

During the implementation, the search spaces in a part of monitoring PDCCH occasions which are consecutive or spaced apart from each other at intervals may be skipped in a simple and direct manner, so it is able to ensure, in a simple manner, that the remaining quantity of times of blind detection to be performed by the terminal side device within the specific time-domain range does not exceed the maximum blind detection capability. As a result, it is able to improve the performance of the terminal side device without any complex calculation.

For example, in a USS set 1 configured by a base station for the terminal side device, there are O monitoring occasions within one slot, and it is presumed that O=3 in this embodiment. It is presumed that there are 14 PDCCH candidates in the search space set, and a CSS includes 7 PDCCH candidates. When the CSS and the USS occur within a same slot, the total quantity of times of blind detection may be 14*3+7=49>44, i.e., the total quantity of times of blind detection may exceed the maximum blind detection capability of the terminal side device within one slot. At this time, the terminal side device may skip a part of monitoring occasions in accordance with the chronological order of the monitoring occasions. For instance, as shown in FIG. 3, the USS includes 3 monitoring occasions within one slot, and the quantity of times of blind detection to be performed by the terminal side device in a third monitoring occasions reaches the maximum blind detection capability of the terminal side device, so the terminal side device may not perform the blind detection on the PDCCH in the third PDCCH monitoring occasion.

Figure 4:
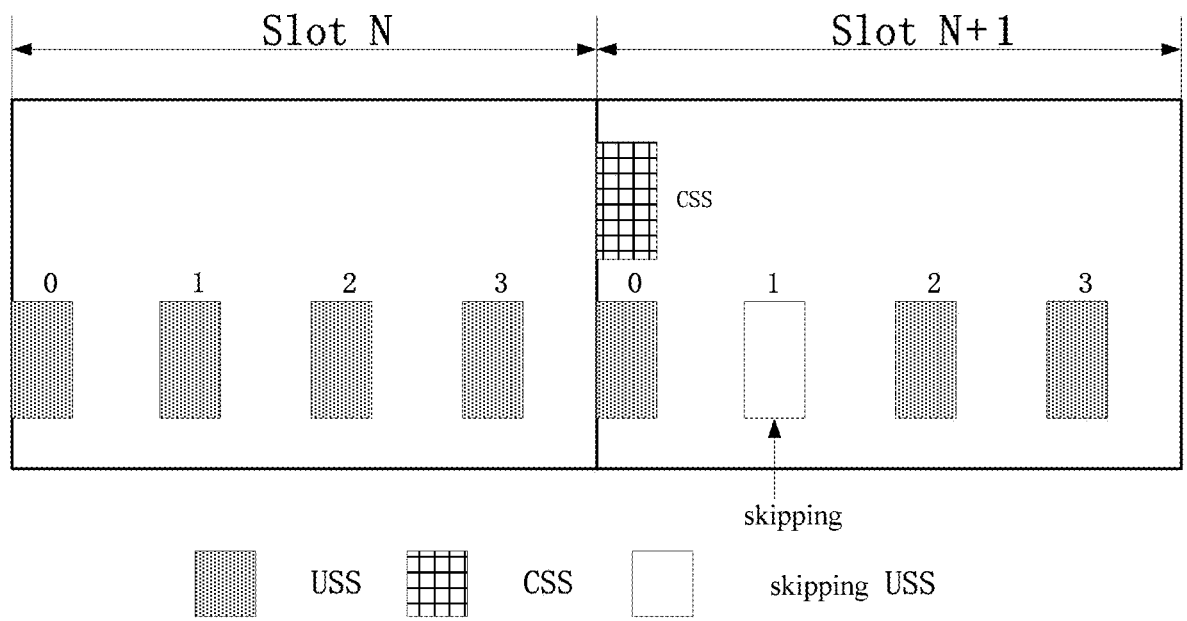
FIG. 4 is another schematic view showing a situation where the blind detection occasion is skipped according to one embodiment of the present disclosure.

For another example, in a UE-specific search space set configured by the base station for the terminal side device, there are O monitoring occasions within one slot, and it is presumed that O=4 in this embodiment. It is presumed that there are 11 PDCCH candidates in the search space set, and a CSS includes 7 PDCCH candidates. When the CSS and the USS occur within a same slot, the total quantity of times of blind detection may be 11*4+7=52>44, i.e., the total quantity of times of blind detection may exceed the maximum blind detection capability of the terminal side device within one slot. At this time, the terminal side device may skip a part of monitoring occasions in accordance with the chronological order of the monitoring occasions. In this embodiment, there are 4 monitoring occasions within the slot, and the terminal side device may at first skip odd-numbered monitoring occasions until the quantity of times of blind detection to be performed does not exceed the maximum blind detection capability of the terminal side device, as shown in FIG. 4. In this embodiment, after the terminal side device has skipped a PDCCH monitoring occasion 1, it is able to ensure that the quantity of times of blind detection to be performed is smaller than the maximum blind detection capability of the terminal side device.

It should be appreciated that, in the embodiments of the present disclosure, the skipping the search spaces in the PDCC monitoring occasions may include skipping all the search spaces in the PDCCH monitoring occasions. Of course, in some embodiments of the present disclosure, it may include skipping a part of search spaces in the PDCCH monitoring occasions, which will not be particularly defined herein as long as the remaining quantity of times of blind detection to be performed by the terminal side device within the specific time-domain range does not exceed the maximum blind detection capability.

In a possible embodiment of the present disclosure, the skipping at intervals, by the terminal side device, the search spaces in a part of the PDCCH monitoring occasions within the specific time-domain range in accordance with the chronological order of the monitoring occasions may include: selecting at intervals, by the terminal side device, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device may skip the search spaces in the PDCCH monitoring occasions that are not selected.

It should be appreciated that, when the quantity of times of blind detection to be performed by the terminal side device in the selected PDCCH monitoring occasions exceeds the maximum blind detection capability or the quantity of CCEs for the selected monitoring PDCCH monitoring occasions exceeds the maximum quantity of CCEs, the part of PDCCH monitoring occasions currently selected at intervals need to be considered as invalid, and thereby may not be included in the selected monitoring occasions. For example, when there are 11 PDCCH monitoring occasions, i.e., M0 to M10, within the specific time-domain range, even-numbered monitoring occasions (M0, M2, M4, M6, M8 and M10) may be selected for the first time at intervals, and the quantity of times of blind detection in these monitoring occasions may exceed the maximum blind detection capability or the quantity of CCEs may exceed the maximum quantity of CCEs. At this time, M0, M2, M4, M6, M8 and M10 may be invalid, and then M0, M2, M4, M6, M8 and M10 may be selected at intervals again.

It should be appreciated that, the selected PDCCH monitoring occasions may include all PDCCH monitoring occasions that have been selected, but may not include the invalid monitoring occasions.

The selection at intervals may refer to the selection of the PDCCH monitoring occasions alternately. For example, when there are 11 PDCCH monitoring occasions, i.e., M0 to M10, within the specific time-domain range, odd-numbered monitoring occasions (i.e., M1, M3, M5, M7 and M9) or even-numbered monitoring occasions (i.e., M0, M2, M4, M6, M8 and M10) in the 11 PDCCH monitoring occasions may be selected at intervals for the first time. In addition, the circularly performing the step of selecting, at intervals, a part of the PDCCH monitoring occasions in the set of PDCCH monitoring occasions may be understood as updating a set of PDCCH monitoring occasions in each cycle and selecting, at intervals, a part of PDCCH monitoring occasions in the updated set of PDCCH monitoring occasions.

When the quantity of times of blind detection to be performed by the terminal side device in the part of PDCCH monitoring occasions exceeds the maximum blind detection capability or the quantity of CCEs in the part of PDCCH monitoring occasions exceeds the maximum quantity of CCEs, it may be understood as that, when any one of the two conditions, i.e., that the quantity of times of blind detection to be performed exceeds the maximum blind detection capability and that the quantity of CCEs exceeds the maximum quantity of CCEs, has been met, the step of selecting, at intervals, a part of the PDCCH monitoring occasions in the set of PDCCH monitoring occasions may be performed circularly. The maximum quantity of CCEs may be preconfigured by the terminal side device, or predefined in a protocol, or preconfigured by the network side device for the terminal side device.

Through circularly performing the step of selecting a part of PDCCH monitoring occasions at intervals, it is able to ensure that the quantity of times of blind detection performed by the terminal side device in the selected PDCCH monitoring occasions reaches or approaches to the maximum blind detection capability or ensure that the quantity of CCEs reaches or approaches to the maximum quantity of CCEs, thereby to maximize the performance of the terminal side device.

It should be appreciated that, the selected PDCCH monitoring occasions may include all selected PDCCH monitoring occasions accumulated currently. The part of PDCCH monitoring occasions currently selected at intervals may include a part of PDCCH monitoring occasions selected in the step of selecting, at intervals, a part of PDCCH monitoring occasions in the set of PDCCH monitoring occasions. For example, when M0, M2, M4, M6, M8 and M10 are selected for the first time at intervals, the part of PDCCH monitoring occasions currently selected at intervals may include M0, M2, M4, M6, M8 and M10, and when M0, M4 and M8 are selected for the second time at intervals from a set of M0, M2, M4, M6, M8 and M10, the part of PDCCH monitoring occasions currently selected at intervals may include M0, M4 and M8. The current set of PDCCH monitoring occasions may be a set of PDCCH monitoring occasions updated each time, or a set of PDCCH monitoring occasions updated before the selection at intervals each time.

In a possible embodiment of the present disclosure, a stopping condition for the selecting, at intervals, a part of the PDCCH monitoring occasions in the set of PDCCH monitoring occasions may include: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

For the condition that the quantity of times of blind detection corresponding to all PDCCH candidates in the selected PDCCH monitoring occasions exceeds the maximum blind detection capability or the quantity of CCEs exceeds the maximum quantity of CCEs, it means that the selecting step may be stopped when the step of selecting, at intervals, a part of PDCCH monitoring occasions in the set of PDCCH monitoring occasions is performed circularly once or multiple times and the quantity of times of blind detection corresponding to all PDCCH candidates in the selected PDCCH monitoring occasions exceeds the maximum blind detection capability or the quantity of CCEs exceeds the maximum quantity of CCEs. At this time, the part of PDCCH monitoring occasions currently selected at intervals may be considered as invalid or may be dropped. In this way, the monitoring occasions may be dropped and the selecting step may be stopped when it is impossible to map all the PDCCH candidates in the PDCCH monitoring occasions currently selected.

When merely one PDCCH monitoring occasion is selected in the step of selecting, at intervals, the part of PDCCH monitoring occasions in the set of PDCCH monitoring occasions, it means that merely one PDCCH monitoring occasion is selected in accordance with a selection rule after the set of PDCCH monitoring occasions has been updated once or multiple times. For example, when the updated set of PDCCH monitoring occasions includes two or three PDCCH monitoring occasions, merely one PDCCH monitoring occasion may probably be selected from the set of PDCCH monitoring occasions.

During the implementation, merely one PDCCH monitoring occasion is selected in a certain cycle, but the quantity of times of blind detection to be performed in all the selected PDCCH monitoring occasions (including a PDCCH monitoring occasion that is selected currently) exceeds the maximum blind detection capability or the quantity of CCEs exceeds the maximum quantity of CCEs. Hence, when a PDCCH monitoring occasion selected finally is unnecessary, the quantity of times of blind detection to be performed has approached the maximum blind detection capability or the quantity of CCEs has approached to the maximum quantity of CCEs.

For example, when there are 11 PDCCH monitoring occasions, i.e., M0 to M10, within the specific time-domain range, even-numbered monitoring occasions (M0, M2, M4, M6, M8 and M10) may be selected for the first time at intervals from the 11 PDCCH monitoring occasions. When the quantity of times of blind detection performed by the terminal side device in the even-numbered monitoring occasions (M0, M2, M4, M6, M8 and M10) exceeds the maximum blind detection capability or the quantity of CCEs exceeds the maximum quantity of CCEs, the even-numbered monitoring occasions (M0, M2, M4, M6, M8 and M10) may be taken as a set of PDCCH monitoring occasions, and 3 PDCCH monitoring occasions, i.e., M0, M4 and M8, may be selected for the second time at intervals from the set.

When the quantity of times of blind detection to be performed in the 3 PDCCH monitoring occasions, i.e., M0, M4 and M8, is smaller than the maximum blind detection capability and the quantity of CCEs is smaller than the maximum quantity of CCEs, the PDCCH monitoring occasions (M2, M6 and M10) that are not selected from a current set of PDCCH monitoring occasions (M0, M2, M4, M6, M8 and M10) may be taken as a set of PDCCH monitoring occasions, and M2 and M10 may be selected for the third time at intervals from the set. At this time, the selected PDCCH monitoring occasions may include M0, M2, M4, M8 and M10.

At this time, when the quantity of times of blind detection to be performed is equal to the maximum blind detection capability and the quantity of CCEs is smaller than or equal to the maximum quantity of CCEs, or when the quantity of CCEs is equal to the maximum quantity of CCEs and the quantity of times of blind detection to be performed is smaller than or equal to the maximum blind detection capability, the selecting step may be stopped.

When the quantity of times of blind detection to be performed in the selected PDCCH monitoring occasions (M0, M2, M4, M8 and M10) exceeds the maximum blind detection capability or the quantity of CCEs exceeds the maximum quantity of CCEs, a part of PDCCH monitoring occasions that are selected currently at intervals, i.e., M2 and M10, may be taken as a set of PDCCH monitoring occasions, and M2 may be selected for the fourth time at intervals. When the quantity of times of blind detection to be performed in the selected PDCCH monitoring occasions M0, M2, M4 and M8 exceeds the maximum blind detection capability or the quantity of CCEs exceeds the maximum quantity of CCEs, the PDCCH monitoring occasion M2 may be dropped, and M0, M4 and M8 may be taken as the PDCCH monitoring occasions to be monitored finally.

Description will be given illustratively hereinafter in conjunction with four embodiments.

Figure 6:
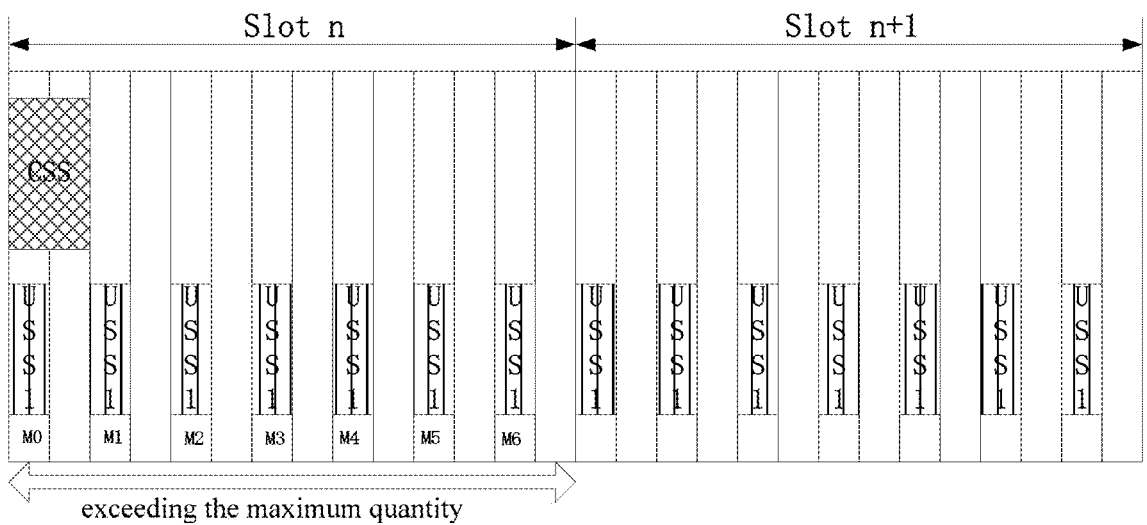
FIG. 6 is a schematic view showing monitoring occasions according to one embodiment of the present disclosure.

First Embodiment: in this embodiment, it is presumed that DCI is of a same payload size, so the quantity of PDCCH candidates is equal to the quantity of times of blind detection. It is presumed that a CSS1 and a USS1 occur simultaneously within a slot N. The CSS1 includes 16 CCEs and 7 PDCCH candidates, and the USS1 includes two candidates at AL4, i.e., includes 8 CCEs. In addition, it is presumed that the USS1 includes 7 monitoring occasions in the slot, as shown in FIG. 6. The maximum quantity of times of blind detection is 44, and the maximum quantity of CCEs is 56. In this embodiment, the total quantity of CCEs in the CSS+USS is 72, which exceeds the maximum quantity of CCEs. The network side device may select the monitoring occasions for the transmission of the PDCCH or the network side device may select the monitoring occasions for monitoring the PDCCH through the following steps.

Step 1: the monitoring occasions may be selected at intervals in accordance with the chronological order of the monitoring occasions, e.g., even-indexed monitoring occasions, i.e., {M0 M2 M4 M6}, may be selected.

Step 2: the quantity of times of blind detection in the 4 monitoring occasions selected in Step 1 in the USS and the CSS and the quantity of CCEs are 15 and 48 respectively, which each does not exceed the maximum quantity, so it may return to Step 1, and the monitoring occasions for transmitting and receiving the PDCCH may be selected continuously in the monitoring occasions that are not selected, i.e., {M1 M3 M5}.

Step 1': the monitoring occasions, i.e., {M1 M5}, may be selected at intervals in {M1 M3 M5} in accordance with the chronological order of the monitoring occasions. At this time, the quantity of times of blind detection and the quantity of CCEs are 19 and 64 respectively, and the quantity of CCEs exceeds the maximum quantity of CCEs, so it may return to Step 1, and the monitoring occasion for transmitting and receiving the PDCCH may be selected continuously in {M1 M5}.

Step 2': M1 may be selected from {M1 M5}. At this time, the quantity of times of blind detection and the quantity of CCEs are 19 and 56 respectively, and the quantity of CCEs is equal to the maximum quantity of CCEs, so the selection procedure may be ended.

Figure 7:
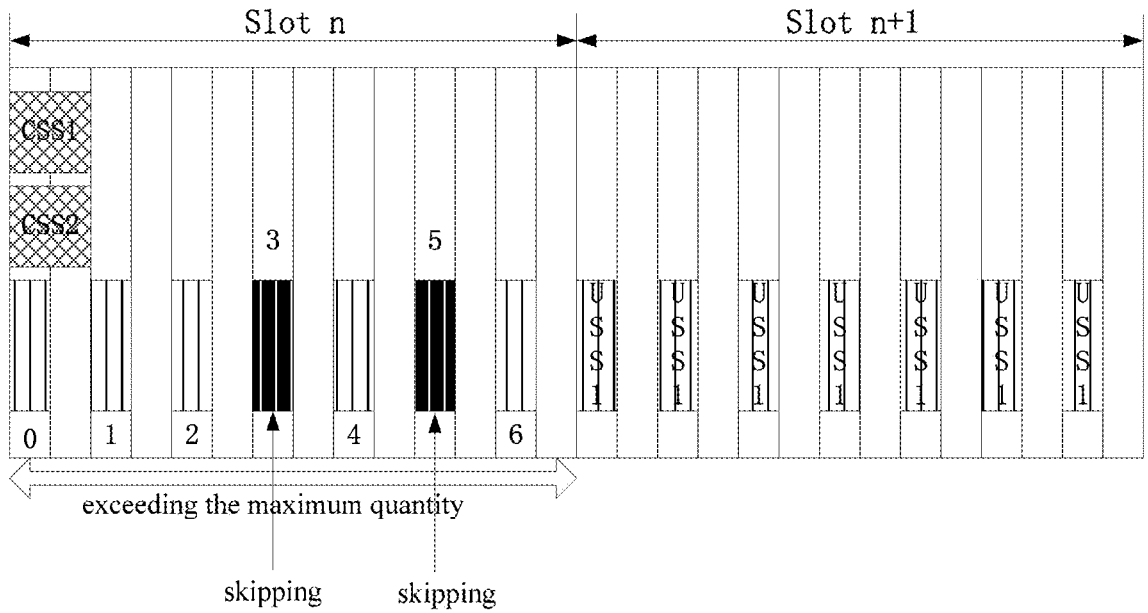
FIG. 7 is still yet another schematic view showing a situation where the blind detection occasion is skipped according to one embodiment of the present disclosure.

Through the above steps, as shown in FIG. 7, the monitoring occasions finally selected may be {M0 M1 M2 M4 M6}, i.e., the network side device may transmit downlink control channels in the 5 monitoring occasions, and the terminal side device may monitor the downlink control channels in the 5 monitoring occasions.

Figure 8:
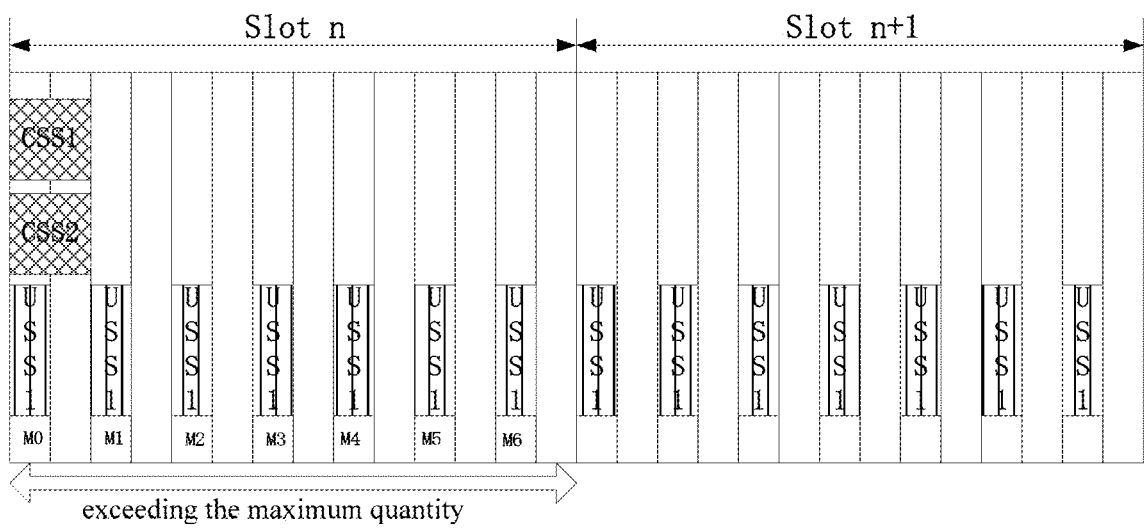
FIG. 8 is another schematic view showing the monitoring occasions according to one embodiment of the present disclosure.

Second Embodiment: in this embodiment, it is presumed that DCI is of a same payload size, so the quantity of PDCCH candidates is equal to the quantity of times of blind detection. It is presumed that a CSS1, a CSS2 and a USS1 occur simultaneously within a slot N. The CSS1 and CSS2 each include 16 CCEs and the USS1 includes two candidates at AL4, i.e., includes 8 CCEs. In addition, it is presumed that the USS1 includes 7 monitoring occasions within the slot, as shown in FIG. 8. The maximum quantity of times of blind detection is 44, and the maximum quantity of CCEs is 56. In this embodiment, the total quantity of CCEs in the CSS+USS is 88, which exceeds the maximum quantity of CCEs. The network side device may select the monitoring occasions for the transmission of the PDCCH or the network side device may select the monitoring occasions for monitoring the PDCCH through the following steps.

Step 1: the monitoring occasions may be selected at intervals in accordance with the chronological order of the monitoring occasions, e.g., even-indexed monitoring occasions, i.e., {M0 M2 M4 M6}, may be selected.

Step 2: the quantity of times of blind detection in the 4 monitoring occasions selected in Step 1 in the USS and the CSS and the quantity of CCEs are 22 and 64 respectively, and the quantity of CCEs exceeds the maximum quantity of CCEs, so the following Step 2-1a may be performed.

Step 2-1a: the monitoring occasions, i.e., {M0 M4}, may be selected at intervals in {M0 M2 M4 M6} in accordance with the chronological order of the monitoring occasions. The quantity of times of blind detection and the quantity of CCEs are 18 and 48 respectively, each of which does not exceed the maximum quantity. At this time, it may return to Step 1, and the monitoring occasions for transmitting and receiving the PDCCH may be selected in {M2 M6}.

Step 1': M2 may be selected from {M2 M6}. At this time, the quantity of times of blind detection and the quantity of CCEs are 20 and 56 respectively, and the quantity of CCEs is equal to the maximum quantity of CCEs, so the selection procedure may be ended.

Figure 9:
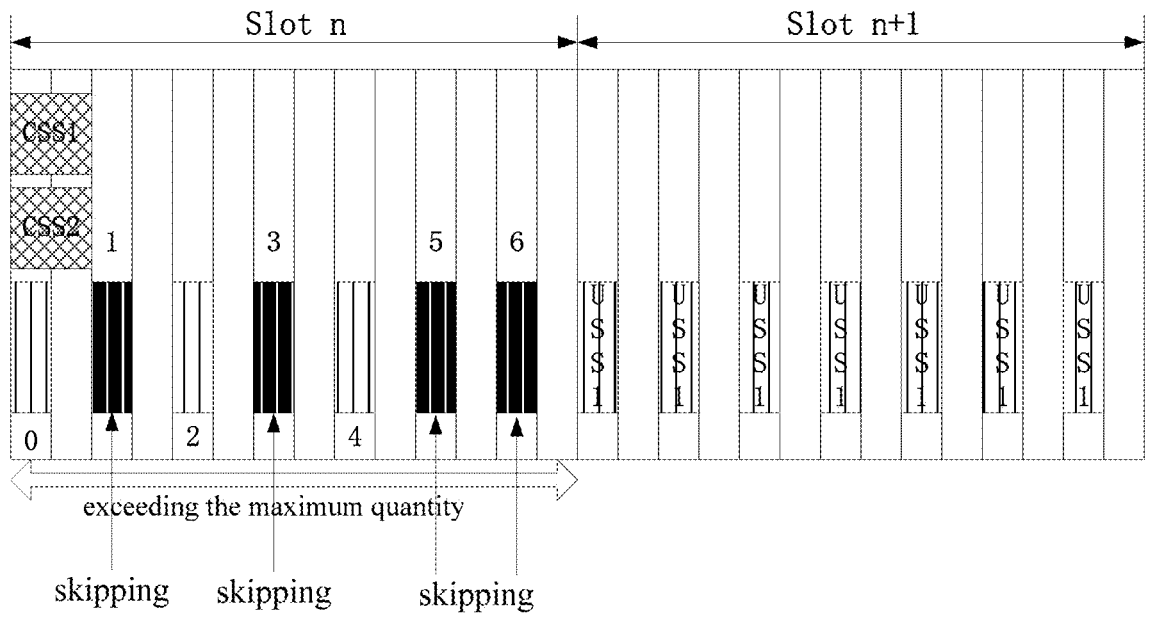
FIG. 9 is still yet another schematic view showing a situation where the blind detection occasion is skipped according to one embodiment of the present disclosure.

Through the above steps, as shown in FIG. 9, the monitoring occasions finally selected may be {M0 M2 M4}, i.e., the network side device may transmit downlink control channels in the 3 monitoring occasions, and the terminal side device may monitor the downlink control channels in the 3 monitoring occasions.

Third Embodiment: in this embodiment, it is presumed that DCI is of a same payload size, so the quantity of PDCCH candidates is equal to the quantity of times of blind detection. It is presumed that a CSS1 and a USS1 occur simultaneously within a slot N. The CSS1 includes 14 CCEs and 7 PDCCH candidates, and the USS1 includes 6 candidates and 6 CCEs. In addition, it is presumed that the USS1 includes 7 monitoring occasions within the slot. The maximum quantity of times of blind detection is 44, and the maximum quantity of CCEs is 56. In this embodiment, the total quantity of CCEs in the CSS+USS is 56. The quantity of times of blind detection is 49, which exceeds the maximum quantity of times of blind detection. The network side device may select the monitoring occasions for the transmission of the PDCCH or the network side device may select the monitoring occasions for monitoring the PDCCH through the following steps.

Step 1: the monitoring occasions may be selected at intervals in accordance with the chronological order of the monitoring occasions, e.g., even-indexed monitoring occasions, i.e., {M0 M2 M4 M6}, may be selected.

Step 2: the quantity of times of blind detection in the 4 monitoring occasions selected in Step 1 in the USS and the CSS and the quantity of CCEs are 31 and 38 respectively, each of which does not exceed the maximum quantity, so it may return to Step 1, and the monitoring occasions for transmitting and receiving the PDCCH may be selected continuously in the monitoring occasions that are not selected, i.e., {M1 M3 M5}.

Step 1': the monitoring occasions, i.e., {M1 M5}, may be selected at intervals in {M1 M3 M5} in accordance with the chronological order of the monitoring occasions. At this time, the quantity of times of blind detection and the quantity of CCEs are 43 and 50 respectively, each of which does not exceed the maximum quantity, so it may return to Step 1, and the monitoring occasion for transmitting and receiving the PDCCH may be selected continuously in {M3}.

Step 2': M3 may be selected. At this time, the quantity of times of blind detection and the quantity of CCEs are 49 and 56 respectively, and the quantity of times of blind detection exceeds the maximum quantity. Because M3 is a last monitoring occasion that is not selected, it needs to be skipped, and the selection procedure may be ended.

Through the above steps, the monitoring occasions finally selected may be {M0 M1 M2 M4 M5 M6}, i.e., the base station may transmit downlink control channels in the 6 monitoring occasions, and the terminal side device may monitor the downlink control channels in the 6 monitoring occasions.

Fourth Embodiment: in this embodiment, it is presumed that DCI is of a same payload size, so the quantity of PDCCH candidates is equal to the quantity of times of blind detection. It is presumed that a CSS1, a CSS2 and a USS1 occur simultaneously within a slot N. The CSS1 and CSS2 totally include 26 PDCCH candidates, and the USS1 includes 6 candidates. In addition, it is presumed that the USS1 includes 7 monitoring occasions within the slot. The maximum quantity of times of blind detection is 44, and the maximum quantity of CCEs is 56. It is also presumed that the total quantity of CCEs does not exceed the maximum quantity. In this embodiment, the total quantity of times of blind detection in CSS+USS is 68, which exceeds the maximum quantity. The network side device may select the monitoring occasions for the transmission of the PDCCH or the network side device may select the monitoring occasions for monitoring the PDCCH through the following steps.

Step 1: the monitoring occasions may be selected at intervals in accordance with the chronological order of the monitoring occasions, e.g., even-indexed monitoring occasions, i.e., {M0 M2 M4 M6}, may be selected.

Step 2: the quantity of times of blind detection in the 4 monitoring occasions selected in Step 1 in the USS and the CSS is 50, which exceeds the maximum quantity, so the following Step 2-1a may be performed.

Step 2-1a: the monitoring occasions, i.e., {M0 M4}, may be selected at intervals in {M0 M2 M4 M6} in accordance with the chronological order of the monitoring occasions. The quantity of times of blind detection is 38, i.e., the quantity of times of blind detection and the quantity of CCEs each do not exceed the maximum quantity. At this time, it may return to Step 1, and the monitoring occasions for transmitting and receiving the PDCCH may be selected continuously in {M2 M6}.

Step 1': M2 may be selected from {M2 M6}. At this time, the quantity of times of blind detection is 44, which is equal to the maximum quantity, so the selection procedure may be ended.

Through the above steps, the monitoring occasions finally selected may be {M0 M2 M4}, i.e., the base station may transmit downlink control channels in the 3 monitoring occasions, and the terminal side device may monitor the downlink control channels in the 3 monitoring occasions.

In a possible embodiment of the present disclosure, the skipping, by the terminal side device, the part of PDCCH candidates in at least one AL in the search spaces within the specific time-domain range may include: when there is a plurality of PDCCH candidates at each AL in each search space within the specific time-domain range, skipping, by the terminal side device, a part of PDCCH candidates at each AL in each search space within the specific time-domain range sequentially until the quantity of times of blind detection to be performed within the specific time-domain range does not exceed the maximum blind detection capability; or when there is an AL with merely one PDCCH candidate in the specific time-domain range, skipping, by the terminal side device, a part of PDCCH candidates at the other ALs in each search space within the specific time-domain range, the other ALs being ALs each with a plurality of PDCCH candidates; or skipping, by the terminal side device, a part of PDCCH candidates at the ALs in each search space within the specific time-domain range in accordance with a specific order of the ALs until the quantity of times of blind detection to be performed by the terminal side device within the specific time-domain range does not exceed the maximum blind detection capability. In a procedure of skipping the PDCCH candidates, with respect to an AL with merely one PDCCH candidate left, the terminal side device may stop skipping the PDCCH candidate at the AL.

During the implementation, in the case that there is a plurality of PDCCH candidates at each AL in each search space within the specific time-domain range, a part of PDCCH candidates at each AL may be skipped in each search space. For example, one or more PDCCH candidates at each AL may be skipped in each search space, but it may be ensured that at least one PDCCH candidate at each AL is not be skipped. In addition, the quantities of PDCCH candidates skipped at the ALs may be the same or different from each other, which will not be particularly defined herein.

During the implementation, it is able to perform a same skipping operation in each search space, ensure that at least one PDCCH candidate at each AL is not skipped, and prevent the occurrence of such a circumstance where the blind detection is not performed at some ALs, thereby to improve the blind detection performance of the terminal side device.

In addition, during the implementation, with respect to the AL with merely one PDCCH candidate, the quantity of PDCCH candidates to be performed by the terminal side device at one or more ALs in the search spaces may be one, so the AL with merely one PDCCH candidate may be provided with a high priority level. The PDCCH candidates at each AL with a plurality of PDCCH candidates may be skipped at first, so as to ensure that at least one PDCCH candidate at each AL is not skipped, and prevent the occurrence of such a circumstance where the blind detection is not performed at some ALs, thereby to improve the blind detection performance of the terminal side device.

In addition, during the implementation, it is also unnecessary to determine whether there is the AL with merely one PDCCH candidate, and instead, a part of PDCCH candidates at the ALs in each search space may be skipped within the specific time-domain range in accordance with the specific order of the ALs, until the quantity of times of blind detection to be performed by the terminal side device within the specific time-domain range does not exceed the maximum blind detection capability. In this way, it is also able to ensure that at least one PDCCH candidate at each AL is not skipped, thereby to improve the blind detection performance of the terminal side device. The specific order of the ALs may be preconfigured by the terminal side device, or predefined in a protocol, or configured by the network side device for the terminal side device. For example, the PDCCH candidates at a larger AL may be skipped at first, and then the PDCCH candidates at a smaller AL may be skipped, until the quantity of times of blind detection to be performed does not exceed the maximum blind detection capability of the terminal side device.

The following description will be given in conjunction with two examples.

First Example: it is presumed that two search spaces, i.e., SS1 and SS2, are configured by the base station for the terminal side device. The two search spaces may have different monitoring periods, e.g., a monitoring period of SS1 may include N slots, and a monitoring period of SS2 may include 2N slots. For ease of description, it is presumed that N=1. It is presumed that SS1 and SS2 include 6 PDCCH candidates at AL=1, 6 PDCCH candidates at AL=2, 2 PDCCH candidates at AL=4 and 2 PDCCH candidates at AL=8. The terminal side device needs to perform the blind detection on downlink control channels in accordance with two kinds of DCI payload sizes, so the quantity of times of blind detection to be performed in one SS may be 32. When SS1 and SS2 occur in a same slot, the total quantity of times of blind detection may be 32*2=64>44, so a part of candidates need to be dropped. The terminal side device may skip a part of candidates in accordance with the following rule.

Step 1: the quantity of times of blind detection to be performed after one PDCCH candidate at AL1 has been skipped may be calculated as 60, which is still greater than 44.

Step 2: the quantity of times of blind detection to be performed after one PDCCH candidate at AL2 has been skipped may be calculated as 56, which is still greater than 44.

Step 3: the quantity of times of blind detection to be performed after one PDCCH candidate at AL4 has been skipped may be calculated as 52, which is still greater than 44.

Step 4: the quantity of times of blind detection to be performed after one PDCCH candidate at AL8 has been skipped may be calculated as 48, which is still greater than 44.

Step 5: the quantity of times of blind detection to be performed after another PDCCH candidate at AL1 has been skipped may be calculated as 44, which is equal to the maximum quantity.

Finally, the terminal side device may perform blind detection on 4 PDCCH candidates at AL=1, 5 PDCCH candidates at AL=2, 1 PDCCH candidate at AL=4, and 1 PDCCH candidate at AL=8.

When calculating the quantity of PDCCH candidates to be skipped in accordance with different ALs, the terminal side device needs to ensure that the quantity of PDCCH candidates to be monitored at all configured ALs is not zero.

Second Example: it is presumed that two search spaces, i.e., SS1 and SS2, are configured by the base station for the terminal side device. The two search spaces may have different monitoring periods, e.g., a monitoring period of SS1 may include N slots, and a monitoring period of SS2 may include 2N slots. For ease of description, it is presumed that N=1. It is presumed that SS1 and SS2 include 9 PDCCH candidates at AL=1, 9 PDCCH candidates at AL=2, 2 PDCCH candidates at AL=4 and 2 PDCCH candidates at AL=8. The terminal side device needs to perform the blind detection on downlink control channels in accordance with two kinds of DCI payload sizes, so the quantity of times of blind detection to be performed in one SS may be 44. When SS1 and SS2 occur in a same slot, the total quantity of times of blind detection may be 44*2=88>44, so a part of candidates need to be dropped. The terminal side device may skip a part of candidates in accordance with the following rule.

Step 1: the quantity of times of blind detection to be performed after one PDCCH candidate at AL1 has been skipped may be calculated as 84, which is still greater than 44.

Step 2: the quantity of times of blind detection to be performed after one PDCCH candidate at AL2 has been skipped may be calculated as 80, which is still greater than 44.

Step 3: the quantity of times of blind detection to be performed after one PDCCH candidate at AL4 has been skipped may be calculated as 76, which is still greater than 44.

Step 4: the quantity of times of blind detection to be performed after one PDCCH candidate at AL8 has been skipped may be calculated as 73, which is still greater than 44.

Step 5: the quantity of times of blind detection to be performed after another PDCCH candidate at AL1 has been skipped may be calculated as 68, which is still greater than 44.

Step 6: the quantity of times of blind detection to be performed after another PDCCH candidate at AL2 has been skipped may be calculated as 64, which is still greater than 44.

Step 7: at this time, merely one PDCCH candidate is left at AL=4, and it has a higher priority level, so it may not be skipped temporarily.

Step 8: at this time, merely one PDCCH candidate is left at AL=8, and it has a higher priority level, so it may not be skipped temporarily.

Step 9: the quantity of times of blind detection to be performed after yet another PDCCH candidate at AL1 has been skipped may be calculated as 60, which is still greater than 44.

Step 10: the quantity of times of blind detection to be performed after yet another PDCCH candidate at AL2 has been skipped may be calculated as 56, which is still greater than 44.

Step 11: the quantity of times of blind detection to be performed after still yet another PDCCH candidate at AL1 has been skipped may be calculated as 52, which is still greater than 44.

Step 12: the quantity of times of blind detection to be performed after still yet another PDCCH candidate at AL2 has been skipped may be calculated as 48, which is still greater than 44.

Step 13: the quantity of times of blind detection to be performed after still yet another PDCCH candidate at AL1 has been skipped may be calculated as 44, which does not exceed the maximum quantity.

Finally, in each search space, the terminal side device may perform blind detection on 4 PDCCH candidates at AL=1, 5 PDCCH candidates at AL=2, 1 PDCCH candidate at AL=4, and 1 PDCCH candidate at AL=8.

In a possible embodiment of the present disclosure, the terminal side device may skip the PDCCH candidates in accordance with an order of the search space, the monitoring occasion and the AL until the remaining quantity of times of blind detection to be performed within the specific time-domain range does not exceed the maximum blind detection capability.

It should be appreciated that, in the above-mentioned three modes, the part of PDCCH candidates at the ALs may be skipped in accordance with the above-mentioned order, until the remaining quantity of times of blind detection to be performed within the specific time-domain range does not exceed the maximum blind detection capability. Through skipping the PDCCH candidates in accordance with the above-mentioned order, it is able to ensure that the remaining quantity of times of blind detection to be performed within the specific time-domain range is equal to or approaches to, rather than much smaller than, the maximum blind detection capability, thereby to ensure the blind detection capability of the terminal side device.

Figure 10:
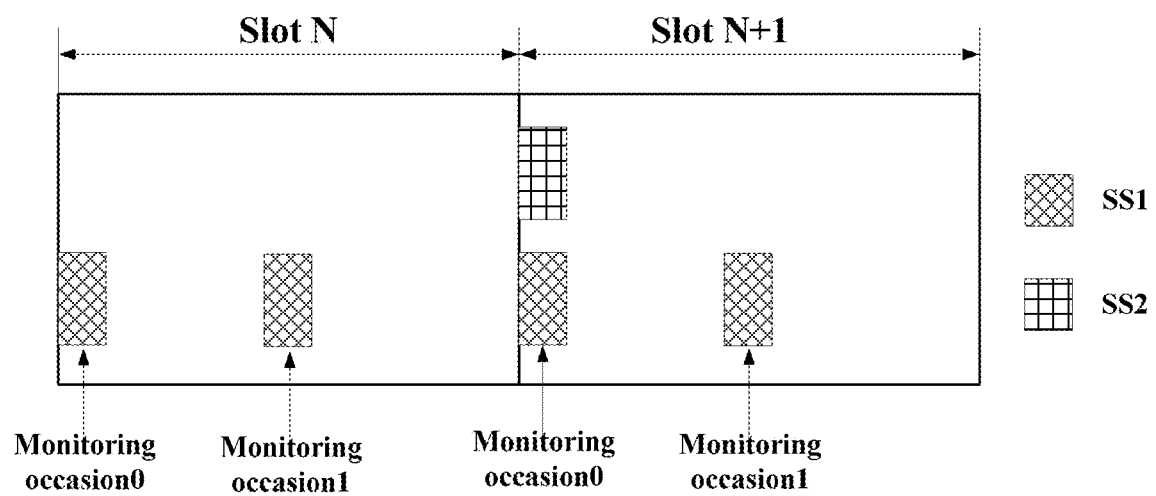
FIG. 10 is still yet another schematic view showing a situation where the blind detection occasion is skipped according to one embodiment of the present disclosure.

For example, it is presumed that two search spaces, i.e., SS1 and SS2, are configured by the base station for the terminal side device. The two search spaces may have different monitoring periods, e.g., a monitoring period of SS1 may include N slots, and a monitoring period of SS2 may include 2N slots. For ease of description, it is presumed that N=1, as shown in FIG. 10. It is presumed that SS1 and SS2 include 4 PDCCH candidates at AL=1, 4 PDCCH candidates at AL=2, 2 PDCCH candidates at AL=4 and 1 PDCCH candidate at AL=8. The terminal side device needs to perform the blind detection on downlink control channels in accordance with two kinds of DCI payload sizes, so the quantity of times of blind detection to be performed in one SS may be 22. When SS1 and SS2 occur in a same slot, the total quantity of times of blind detection may be 22*3=66>44, so a part of candidates need to be dropped. The terminal side device may skip a part of candidates in accordance with the following rule.

Step 1: in a monitoring occasion 0, one PDCCH candidate at AL1 in SS1 may be skipped, and the quantity of times of blind detection to be performed may be 64>44.

Step 2: in the monitoring occasion 0, one PDCCH candidate at AL1 in SS2 may be skipped, and the quantity of times of blind detection to be performed may be 62>44.

Step 3: in a monitoring occasion 1, one PDCCH candidate at AL1 in SS1 may be skipped, and the quantity of times of blind detection to be performed may be 60>44.

Step 4: in the monitoring occasion 0, one PDCCH candidate at AL2 in SS1 may be skipped, and the quantity of times of blind detection to be performed may be 58>44.

Step 5: in the monitoring occasion 0, one PDCCH candidate at AL2 in SS2 may be skipped, and the quantity of times of blind detection to be performed may be 56>44.

Step 6: in the monitoring occasion 1, one PDCCH candidate at AL2 in SS1 may be skipped, and the quantity of times of blind detection to be performed may be 54>44.

Step 7: in the monitoring occasion 0, one PDCCH candidate at AL4 in SS1 may be skipped, and the quantity of times of blind detection to be performed may be 52>44.

Step 8: in the monitoring occasion 0, one PDCCH candidate at AL4 in SS2 may be skipped, and the quantity of times of blind detection to be performed may be 50>44.

Step 9: in the monitoring occasion 1, one PDCCH candidate at AL4 in SS1 may be skipped, and the quantity of times of blind detection to be performed may be 48>44.

Step 10: there is one PDCCH candidate at AL8 in SS1 and SS2, so no PDCCH candidate may be skipped temporarily.

Step 11: in the monitoring occasion 0, one PDCCH candidate at AL1 in SS1 may be skipped, and the quantity of times of blind detection to be performed may be 46>44.

Step 12: in the monitoring occasion 0, one PDCCH candidate at AL1 in SS2 may be skipped, and the quantity of times of blind detection to be performed may be 44=44.

Hence, within a slot N+1, the quantity of times of blind detection to be performed by the terminal side device in different SSs in the monitoring occasions may be shown in Table 1.

TABLE 1

|  | Monitoring occasion 0 | | Monitoring occasion 1 |
| --- | --- | --- | --- |
| Search space | SS1 | SS2 | SS1 |
| AL1 | 2 | 2 | 3 |
| AL2 | 3 | 3 | 3 |
| AL4 | 1 | 1 | 1 |
| AL8 | 1 | 1 | 1 |

It should be appreciated that, in the embodiments of the present disclosure, apart from the order mentioned hereinabove, the candidates may be skipped in any other order, which will not be particularly defined herein.

In a possible embodiment of the present disclosure, the skipping, by the terminal side device, the part of search spaces within the specific time-domain range may include: skipping, by the terminal side device, the part of search spaces within the specific time-domain range in accordance with a size of a monitoring period; or skipping, by the terminal side device, the part of search spaces within the specific time-domain range in accordance with an RNTI; or skipping, by the terminal side device, USSs in a specific CORESET, the specific CORESET being a CORESET for transmitting CSSs.

During the implementation, a part of search spaces may be skipped within the specific time-domain range in accordance with the monitoring periods. To be specific, a search space with a large monitoring period or a small monitoring period may be skipped preferentially. For example, it is presumed that two search spaces, i.e., SS1 and SS2, are configured by the base station for the terminal side device. The two search spaces may have different monitoring periods, e.g., a monitoring period of SS1 may include N slots, and a monitoring period of SS2 may include 2N slots. For ease of description, it is presumed that N=1. It is presumed that SS1 and SS2 include 9 PDCCH candidates at AL=1, 9 PDCCH candidates at AL=2, 2 PDCCH candidates at AL=4 and 2 PDCCH candidates at AL=8. The terminal side device needs to perform the blind detection on downlink control channels in accordance with two kinds of DCI payload sizes, so the quantity of times of blind detection to be performed in one SS may be 44. When SS1 and SS2 occur in a same slot, the total quantity of times of blind detection may be 44*2=88>44, so a part of candidates need to be dropped. The terminal side device may skip a part of candidates in accordance with the following rule.

Figure 5:
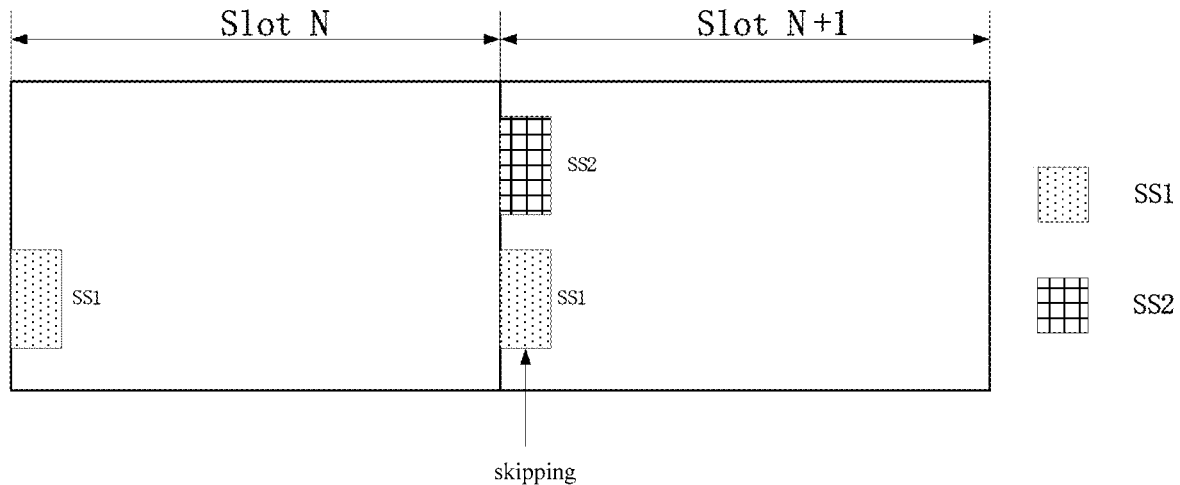
FIG. 5 is yet another schematic view showing a situation where the blind detection occasion is skipped according to one embodiment of the present disclosure.

The terminal side device may skip one SS in accordance with the monitoring periods of the SSs. For example, as shown in FIG. 5, the terminal side device may skip an SS with a small monitoring period or a large monitoring period.

In addition, during the implementation, a part of search spaces may be further skipped in accordance with the RNTI corresponding to each search space. For example, it is presumed that different RNRIs corresponding to the SSs are configured by the base station for the terminal side device, e.g., an RNTI corresponding to SS1 may be a Cell Radio Network Temporary Identifier (C-RNTI), an RNTI corresponding to SS2 may be a Configured Scheduling Radio Network Temporary Identifier (CS-RNTI), and an RNTI corresponding to SS3 may be an X-RNTI. Here, X-RNTI may be of any possible RNTI value, which will not be particularly defined herein. The terminal side device may skip a part of search spaces in accordance with the RNTI values of different SSs.

For example, the terminal side device may skip the corresponding search spaces as follows. The terminal side device may skip a search space with a corresponding RNTI as C-RNTI at first, or preferentially skip a search space with the other RNTI values.

In other words, it is necessary to define a priority level for each RNTI value, e.g., System Information Radio Network Temporary Identifier (SI-RNTI)=Paging-Radio Network Temporary Identity (P-RNTI)=Random Access Radio Network Temporary Identifier (RA-RNTI)=Slot Format Indicator Radio Network Temporary Identifier (SFI-RNTI)>CS-RNTI>C-RNTI. Of course, any other priority order may also be provided.

In addition, during the implementation, the USS transmitted in the CORESET for transmitting the CSS may be skipped preferentially, so as to ensure the blind detection performance of the terminal side device. This is because, in actual use, it is more likely to detect, in a blind manner, a signal from the network side device in the CSS.

In a possible embodiment of the present disclosure, the skipping, by the terminal side device, the search spaces in a part of CORESETs within the specific time-domain range may include skipping the search spaces in one or more CORESETs in accordance with a configuration of the CORESETs to which the search spaces belong. For example, the skipping, by the terminal side device, the search spaces in a part of CORESETs within the specific time-domain range may include: skipping, by the terminal side device, the search spaces in a part of CORESETs within the specific time-domain in accordance with a mapping mode; or skipping, by the terminal side device, search spaces in a specific CORESET within the specific time-domain range preferentially, the specific CORESET being a CORESET in a plurality of CORESETs whose QCL matches target QCL at a lowest matching level within the specific time-domain range, the target QCL being QCL acquired through beam management.

During the implementation, the search spaces in a part of CORESETs may be skipped in accordance with the configuration of the CORESETs, so as to improve the flexibility of skipping the blind detection occasions, thereby to meet the requirements of different services or scenarios.

In a possible embodiment of the present disclosure, the skipping, by the terminal side device, the search spaces in a part of CORESETs within the specific time-domain range in accordance with the mapping mode may include: skipping, by the terminal side device, search spaces in localized mapping CORESETs within the specific time-domain range preferentially; or skipping, by the terminal side device, search spaces in distributed-mapping CORESETs within the specific time-domain range preferentially.

During the implementation, in the case that different search spaces are transmitted in different CORESETs, the terminal side device may preferentially skip the localized-mapping CORESETs, or the distributed-mapping CORESETs, or preferentially skip the CORESET whose QCL matches the QCL acquired through beam management at a lowest matching level.

For example, it is presumed that the SSs configured by the base station for the terminal side device are transmitted in different CORESETs, and the CORESETs are provided with different configuration parameters, e.g., a mapping mode of CORESET1 is localized mapping and a QCL parameter is QCL1, and a mapping mode of CORESET2 is distributed mapping and a QCL parameter is QCL2. The terminal side device may determine the CORESET where the search spaces are to be skipped in accordance with the configurations of the CORESETs.

The terminal side device may skip the corresponding search spaces in the following order. The terminal side device may preferentially skip the CORESET whose QCL matches the QCL acquired through the beam management at a lowest matching level, or preferentially skip the localized-mapping or distributed-mapping CORESET.

According to the embodiments of the present disclosure, when the quantity of times of blind detection to be performed by the terminal side device within the specific time-domain range exceeds the maximum blind detection capability, the terminal side device may skip a part of the blind detection occasions within the specific time-domain range, and perform the channel blind detection in the remaining blind detection occasions. The maximum blind detection capability may be the maximum quantity of times of blind detection performed by the terminal side device within the specific time-domain range, and the remaining quantity of times of blind detection to be performed by the terminal side device within the specific time-domain range may not exceed the maximum blind detection capability. Because a part of the blind detection occasions are skipped, the remaining quantity of times of blind detection to be performed by the terminal side device within the specific time-domain range may not exceed the maximum blind detection capability, so it is able to improve the performance of the terminal side device.

Figure 11:
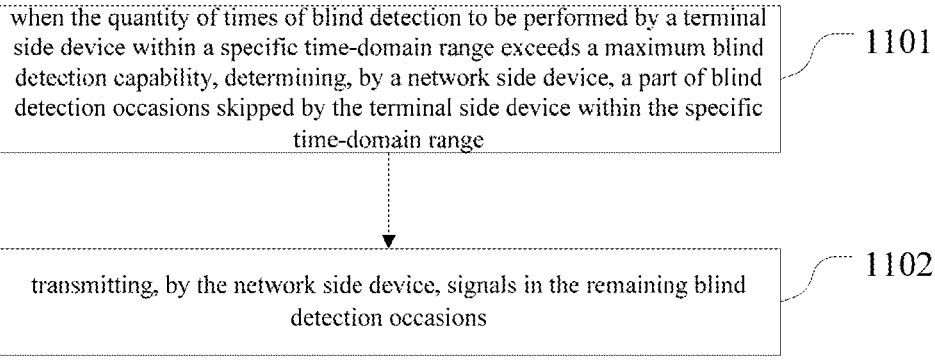
FIG. 11 is a flow chart of a signal transmission method according to one embodiment of the present disclosure.

The present disclosure further provides in some embodiments a signal transmission method which, as shown in FIG. 11, includes: Step 1101 of, when the quantity of times of blind detection to be performed by a terminal side device within a specific time-domain range exceeds a maximum blind detection capability, determining, by a network side device, a part of blind detection occasions skipped by the terminal side device within the specific time-domain range, the maximum blind detection capability being a maximum quantity of times of blind detection performed by the terminal side device within the specific time-domain range; and Step 1102 of transmitting, by the network side device, signals in the remaining blind detection occasions. The remaining quantity of times of blind detection to be performed by the terminal side device within the specific time-domain range does not exceed the maximum blind detection capability.

It should be appreciated that, in the embodiments of the present disclosure, an order of Step 1101 and Step 1102 will not be particularly defined herein. For example, as shown in FIG. 11, Step 1101 may be executed prior to Step 1102, or an execution time of Step 1101 may overlap an execution time of Step 1102. For example, Step 1101 may be executed during the execution of Step 1102 so as to determine the blind detection occasions skipped by the terminal side device, thereby not to transmit the signals in these blind detection occasions in Step 1102.

In addition, in the embodiments of the present disclosure, the determining the blind detection occasions to be skipped may be the same as the determining, by the network side device, the blind detection occasions skipped by the terminal side device, so it is able to ensure that the remaining quantity of times of blind detection to be performed by the terminal side device within the specific time-domain range does not exceed the maximum blind detection capability, thereby to prevent the transmission performance of a communications system from deterioration while improving the performance of the terminal side device.

In a possible embodiment of the present disclosure, the determining, by the network side device, the part of blind detection occasions to be skipped by the terminal side device within the specific time-domain range may include at least one of: determining, by the network side device, a part of PDCCH candidates in at least one AL in search spaces skipped by the terminal side device within the specific time-domain range; determining, by the network side device, a part of search spaces skipped by the terminal side device within the specific time-domain range; or determining, by the network side device, search spaces in a part of CORESETs skipped by the terminal side device within the specific time-domain range.

In a possible embodiment of the present disclosure, a plurality of PDCCH monitoring occasions or a plurality of search space types may be provided within the specific time-domain range. The determining, by the network side device, a part of search spaces skipped by the terminal side device within the specific time-domain range may include: determining, by the network side device, search spaces in a part of the PDCCH monitoring occasions continuously skipped by the terminal side device within the specific time-domain range in accordance with a chronological order of the monitoring occasions; or determining, by the network side device, the search spaces in a part of the PDCCH monitoring occasions skipped by the terminal side device at intervals within the specific time-domain range in accordance with the chronological order of the monitoring occasions.

In a possible embodiment of the present disclosure, the determining, by the network side device, the search spaces in a part of the PDCCH monitoring occasions skipped by the terminal side device at intervals within the specific time-domain range in accordance with the chronological order of the monitoring occasions may include: selecting, by the network side device at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device may skip the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions may include: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the determining, by the network side device, a part of PDCCH candidates in at least one AL in the search spaces skipped by the terminal side device within the specific time-domain range may include: when there is a plurality of PDCCH candidates at each AL in each search space within the specific time-domain range, determining, by the network side device, a part of PDCCH candidates at each AL in each search space skipped by the terminal side device within the specific time-domain range sequentially; or when there is an AL with merely one PDCCH candidate in the specific time-domain range, determining, by the network side device, a part of PDCCH candidates at the other ALs in each search space skipped by the terminal side device within the specific time-domain range, the other ALs being ALs each with a plurality of PDCCH candidates; or determining, by the network side device, a part of PDCCH candidates at the ALs in each search space skipped by the terminal side device within the specific time-domain range in accordance with a specific order of the ALs. In a procedure of skipping the PDCCH candidates, with respect to an AL with merely one PDCCH candidate left, the terminal side device stops skipping the PDCCH candidate at the AL.

In a possible embodiment of the present disclosure, the terminal side device may skip the PDCCH candidates in accordance with an order of the search space, the monitoring occasion and the AL until the remaining quantity of times of blind detection to be performed within the specific time-domain range does not exceed the maximum blind detection capability.

In a possible embodiment of the present disclosure, the determining, by the network side device, a part of search spaces skipped by the terminal side device within the specific time-domain range may include: determining, by the network side device, the part of search spaces skipped by the terminal side device within the specific time-domain range in accordance with a size of a monitoring period; or determining, by the network side device, the part of search spaces skipped by the terminal side device within the specific time-domain range in accordance with an RNTI; or determining, by the network side device, USSs skipped by the terminal side device in a specific CORESET, the specific CORESET being a CORESET for transmitting CSSs.

In a possible embodiment of the present disclosure, the determining, by the network side device, the search spaces in a part of CORESETs skipped by the terminal side device within the specific time-domain range may include: determining, by the network side device, the search spaces in a part of CORESETs skipped by the terminal side device within the specific time-domain in accordance with a mapping mode; or determining, by the network side device, search spaces in a specific CORESET skipped preferentially by the terminal side device within the specific time-domain range, the specific CORESET being a CORESET in a plurality of CORESETs whose QCL matches target QCL at a lowest matching level within the specific time-domain range, the target QCL being QCL acquired through beam management.

In a possible embodiment of the present disclosure, the determining, by the network side device, the search spaces in the part of CORESETs skipped by the terminal side device within the specific time-domain range in accordance with the mapping mode may include: determining, by the network side device, search spaces in localized mapping CORESETs skipped by the terminal side device preferentially within the specific time-domain range; or determining, by the network side device, search spaces in distributed-mapping CORESETs skipped by the terminal side device preferentially within the specific time-domain range.

In a possible embodiment of the present disclosure, the specific time-domain range may be a slot.

The following description will be given illustratively when the network side device is a base station.

When transmitting signals to or scheduling the terminal side device, the base station may take a terminal's behavior of skipping a part of PDCCH candidates into consideration in the following modes.

First Mode: when the quantity of times of blind detection to be performed by the terminal side device within one slot exceeds a terminal capability, the base station may preferentially transmit downlink control channels in search spaces in first N monitoring occasions in accordance with a chronological order of the monitoring occasions, or transmit downlink control channels in search spaces in monitoring occasions at intervals in a comb manner in accordance with the chronological order of the monitoring occasions, or transmit a corresponding downlink control channel in a CSS when the downlink control channel needs to be transmitted in the CSS.

Second Mode: when the quantity of times of blind detection to be performed by the terminal side device within one slot exceeds the terminal capability, the base station may transmit downlink control channels in a part of PDCCH candidates at each AL in a way agreed with the terminal side device.

Third mode: when the quantity of times of blind detection to be performed by the terminal side device within one slot exceeds the terminal capability, the base station may transmit downlink control channels in search spaces in specific monitoring occasions in accordance with PDCCH monitoring periods.

Fourth mode: when the quantity of times of blind detection to be performed by the terminal side device within one slot exceeds the terminal capability, the base station may transmit downlink control channels in a part of CORESETs using a rule corresponding to the terminal side device in accordance with different configurations of the CORESETs.

Fifth Mode: when the quantity of times of blind detection to be performed by the terminal side device within one slot exceeds the terminal capability, the base station may transmit downlink control channels in CORESETs where no CSS is transmitted.

It should be appreciated that, the implementation of the signal transmission method may refer to that of the network side device in FIG. 2 with a same or similar beneficial effect, which will not be particularly defined herein.

Figure 12:
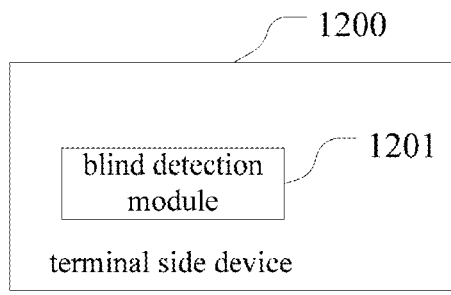
FIG. 12 is a schematic view showing a terminal side device according to one embodiment of the present disclosure.

The present disclosure further provides in some embodiments a terminal side device 1200 which, as shown in FIG. 12, includes a blind detection module 1201 configured to, when the quantity of times of blind detection to be performed by a terminal side device within a specific time-domain range exceeds a maximum blind detection capability, skip a part of blind detection occasions within the specific time-domain range, and perform channel blind detection in the remaining blind detection occasions. The maximum blind detection capability is the maximum quantity of times of blind detection performed by the terminal side device within the specific time-domain range, and the remaining quantity of times of blind detection to be performed by the terminal side device within the specific time-domain range does not exceed the maximum blind detection capability.

Figure 13:
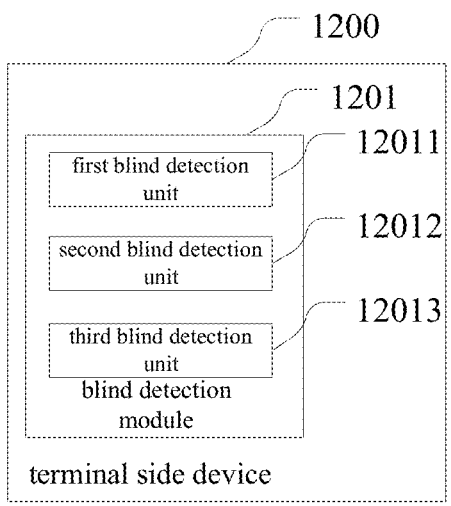
FIG. 13 is another schematic view showing the terminal side device according to one embodiment of the present disclosure.

In a possible embodiment of the present disclosure, as shown in FIG. 13, the blind detection module 1201 may include at least one of: a first blind detection unit 12011 configured to, when the quantity of times of blind detection to be performed by the terminal side device within the specific time-domain range exceeds the maximum blind detection capability, skip a part of PDCCH candidates in at least one AL in search spaces within the specific time-domain range, and perform the channel blind detection on the remaining PDCCH candidates; a second blind detection unit 12012 configured to, when the quantity of times of blind detection to be performed by the terminal side device within the specific time-domain range exceeds the maximum blind detection capability, skip a part of search spaces within the specific time-domain range, and perform the channel blind detection in the remaining search spaces; or a third blind detection unit 12013 configured to, when the quantity of times of blind detection to be performed by the terminal side device within the specific time-domain range exceeds the maximum blind detection capability, skip search spaces in a part of CORESETs within the specific time-domain range, and perform the channel blind detection in search spaces in the remaining CORESETs.

In a possible embodiment of the present disclosure, a plurality of PDCCH monitoring occasions or a plurality of search space types may be provided within the specific time-domain range. The second blind detection unit 12012 is further configured to: continuously skip search spaces in a part of the PDCCH monitoring occasions within the specific time-domain range in accordance with a chronological order of the monitoring occasions; or skip, at intervals, the search spaces in a part of the PDCCH monitoring occasions within the specific time-domain range in accordance with the chronological order of the monitoring occasions.

In a possible embodiment of the present disclosure, the second blind detection unit 12012 is further configured to: select, at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, take a part of PDCCH monitoring occasions currently selected at intervals as the set of PDCCH monitoring occasions, and circularly perform the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, take PDCCH monitoring occasions not selected in a current set of PDCCH monitoring occasions as the set of PDCCH monitoring occasions, and circularly preform the step of selecting, at intervals, a part of the PDCCH monitoring occasions in the set of PDCCH monitoring occasions. The terminal side device may skip the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions may include: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the first blind detection unit 12011 is further configured to: when there is a plurality of PDCCH candidates at each AL in each search space within the specific time-domain range, skip a part of PDCCH candidates at each AL in each search space within the specific time-domain range sequentially until the quantity of times of blind detection to be performed within the specific time-domain range does not exceed the maximum blind detection capability; or when there is an AL with merely one PDCCH candidate in the specific time-domain range, skip a part of PDCCH candidates at the other ALs in each search space within the specific time-domain range, the other ALs being ALs each with a plurality of PDCCH candidates; or skip a part of PDCCH candidates at the ALs in each search space within the specific time-domain range in accordance with a specific order of the ALs until the quantity of times of blind detection to be performed by the terminal side device within the specific time-domain range does not exceed the maximum blind detection capability. In a procedure of skipping the PDCCH candidates, with respect to an AL with merely one PDCCH candidate left, the terminal side device may stop skipping the PDCCH candidate at the AL.

In a possible embodiment of the present disclosure, the terminal side device may skip the PDCCH candidates in accordance with an order of the search space, the monitoring occasion and the AL until the remaining quantity of times of blind detection to be performed within the specific time-domain range does not exceed the maximum blind detection capability.

In a possible embodiment of the present disclosure, the second blind detection unit 12012 is further configured to: skip the part of search spaces within the specific time-domain range in accordance with a size of a monitoring period; or skip the part of search spaces within the specific time-domain range in accordance with an RNTI; or skip USSs in a specific CORESET, the specific CORESET being a CORESET for transmitting CSSs.

In a possible embodiment of the present disclosure, the third blind detection unit 12013 is further configured to: skip the search spaces in a part of CORESETs within the specific time-domain in accordance with a mapping mode; or skip search spaces in a specific CORESET within the specific time-domain range preferentially, the specific CORESET being a CORESET in a plurality of CORESETs whose QCL matches target QCL at a lowest matching level within the specific time-domain range, the target QCL being QCL acquired through beam management.

In a possible embodiment of the present disclosure, the third blind detection unit 12013 is further configured to: skip search spaces in localized mapping CORESETs within the specific time-domain range preferentially; or skip search spaces in distributed-mapping CORESETs within the specific time-domain range preferentially.

In a possible embodiment of the present disclosure, the specific time-domain range may be a slot.

It should be appreciated that, the terminal side device 1200 may be the terminal side device in the above-mentioned method embodiments, and the terminal side device 1200 is capable of implementing the above-mentioned channel blind detection method with a same or similar beneficial effect, which will not be particularly defined herein.

Figure 14:
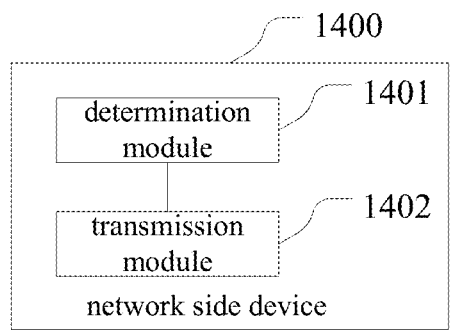
FIG. 14 is a schematic view showing a network side device according to one embodiment of the present disclosure.

The present disclosure further provides in some embodiments a network side device 1400 which, as shown in FIG. 14, includes: a determination module 1401 configured to, when the quantity of times of blind detection to be performed by a terminal side device within a specific time-domain range exceeds a maximum blind detection capability, determine a part of blind detection occasions skipped by the terminal side device within the specific time-domain range, the maximum blind detection capability being a maximum quantity of times of blind detection performed by the terminal side device within the specific time-domain range; and a transmission module 1402 configured to transmit signals in the remaining blind detection occasions. The remaining quantity of times of blind detection to be performed by the terminal side device within the specific time-domain range does not exceed the maximum blind detection capability.

Figure 15:
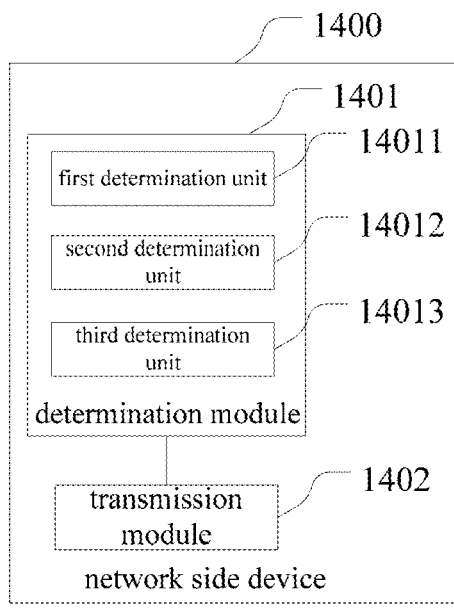
FIG. 15 is another schematic view showing the network side device according to one embodiment of the present disclosure.

In a possible embodiment of the present disclosure, as shown in FIG. 15, the determination module 1401 may include at least one of: a first determination unit 14011 configured to, when the quantity of times of blind detection to be performed by the terminal side device within the specific time-domain range exceeds the maximum blind detection capability, determine a part of PDCCH candidates in at least one AL in search spaces skipped by the terminal side device within the specific time-domain range; a second determination unit 14012 configured to, when the quantity of times of blind detection to be performed by the terminal side device within the specific time-domain range exceeds the maximum blind detection capability, determine a part of search spaces skipped by the terminal side device within the specific time-domain range; or a third determination unit 14013 configured to, when the quantity of times of blind detection to be performed by the terminal side device within the specific time-domain range exceeds the maximum blind detection capability, determine search spaces in a part of CORESETs skipped by the terminal side device within the specific time-domain range.

In a possible embodiment of the present disclosure, a plurality of PDCCH monitoring occasions or a plurality of search space may be is provided within the specific time-domain range. The second determination unit 14012 is further configured to: determine search spaces in a part of the PDCCH monitoring occasions continuously skipped by the terminal side device within the specific time-domain range in accordance with a chronological order of the monitoring occasions; or determine the search spaces in a part of the PDCCH monitoring occasions skipped by the terminal side device at intervals within the specific time-domain range in accordance with the chronological order of the monitoring occasions.

In a possible embodiment of the present disclosure, the second determination unit 14012 is further configured to:

select, at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, take a part of PDCCH monitoring occasions currently selected at intervals as the set of PDCCH monitoring occasions, and circularly perform the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, take PDCCH monitoring occasions not selected in a current set of PDCCH monitoring occasions as the set of PDCCH monitoring occasions, and circularly preform the step of selecting, at intervals, a part of the PDCCH monitoring occasions in the set of PDCCH monitoring occasions. The terminal side device may skip the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions may include: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the first determination unit 14011 is further configured to: when there is a plurality of PDCCH candidates at each AL in each search space within the specific time-domain range, determine a part of PDCCH candidates at each AL in each search space skipped by the terminal side device within the specific time-domain range sequentially; or when there is an AL with merely one PDCCH candidate in the specific time-domain range, determine a part of PDCCH candidates at the other ALs in each search space skipped by the terminal side device within the specific time-domain range, the other ALs being ALs each with a plurality of PDCCH candidates; or determine a part of PDCCH candidates at the ALs in each search space skipped by the terminal side device within the specific time-domain range in accordance with a specific order of the ALs. In a procedure of skipping the PDCCH candidates, with respect to an AL with merely one PDCCH candidate left, the terminal side device stops skipping the PDCCH candidate at the AL.

In a possible embodiment of the present disclosure, the terminal side device may skip the PDCCH candidates in accordance with an order of the search space, the monitoring occasion and the AL until the remaining quantity of times of blind detection to be performed within the specific time-domain range does not exceed the maximum blind detection capability.

In a possible embodiment of the present disclosure, the second determination unit 14012 is further configured to: determine the part of search spaces skipped by the terminal side device within the specific time-domain range in accordance with a size of a monitoring period; or determine the part of search spaces skipped by the terminal side device within the specific time-domain range in accordance with an RNTI; or determine USSs skipped by the terminal side device in a specific CORESET, the specific CORESET being a CORESET for transmitting CSSs.

In a possible embodiment of the present disclosure, the third determination unit 14013 is further configured to: determine the search spaces in a part of CORESETs skipped by the terminal side device within the specific time-domain in accordance with a mapping mode; or determine search spaces in a specific CORESET skipped preferentially by the terminal side device within the specific time-domain range, the specific CORESET being a CORESET in a plurality of CORESETs whose QCL matches target QCL at a lowest matching level within the specific time-domain range, the target QCL being QCL acquired through beam management.

In a possible embodiment of the present disclosure, the third determination unit 14013 is further configured to: determine search spaces in localized mapping CORESETs skipped by the terminal side device preferentially within the specific time-domain range; or determine search spaces in distributed-mapping CORESETs skipped by the terminal side device preferentially within the specific time-domain range.

In a possible embodiment of the present disclosure, the specific time-domain range may be a slot.

It should be appreciated that, the network side device 1400 in the embodiments of the present disclosure may be the network side device in the above method embodiments, and the network side device 1400 is capable of implementing the above-mentioned signal transmission method with a same technical effect, which will not be particularly defined herein.

Figure 16:
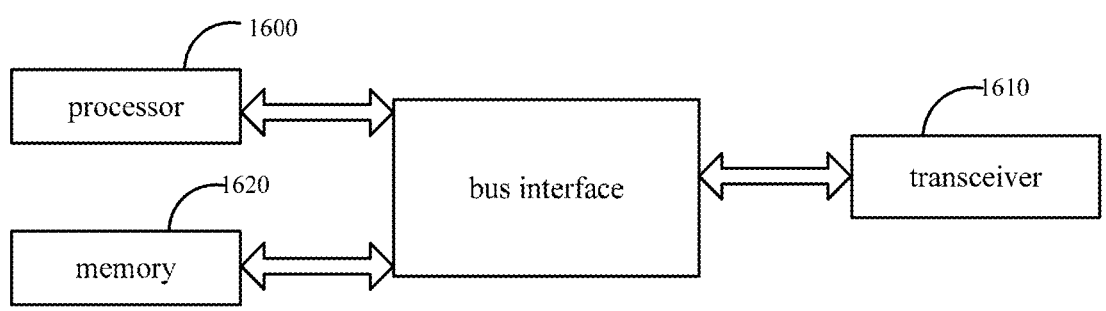
FIG. 16 is yet another schematic view showing the network side device according to one embodiment of the present disclosure.

The present disclosure further provides in some embodiments a terminal side device which, as shown in FIG. 16, includes a transceiver 1610, a memory 1620, a processor 1600, and a computer program stored in the memory 1620 and executed by the processor. The processor 1600 is configured to read and execute the computer program stored in the memory, so as to execute a procedure of, when the quantity of times of blind detection to be performed by a terminal side device within a specific time-domain range exceeds a maximum blind detection capability, skipping a part of blind detection occasions within the specific time-domain range, and performing channel blind detection in the remaining blind detection occasions. The maximum blind detection capability is the maximum quantity of times of blind detection performed by the terminal side device within the specific time-domain range, and the remaining quantity of times of blind detection to be performed by the terminal side device within the specific time-domain range does not exceed the maximum blind detection capability. The transceiver 1610 is further configured to receive and transmit data under the control of the processor 1600.

In FIG. 16, bus architecture may include a number of buses and bridges connected to each other, so as to connect various circuits for one or more processors 1600 and one or more memories 1620. In addition, as is known in the art, the bus architecture may be used to connect any other circuits, such as a circuit for a peripheral device, a circuit for a voltage stabilizer and a power management circuit. A bus interface may be provided, and the transceiver 1610 may consist of a plurality of elements, i.e., a transmitter and a receiver for communication with any other devices over a transmission medium.

The processor 1600 may take charge of managing the bus architecture as well as general processings. The memory 1620 may store therein data for the operation of the processor 1600.

It should be appreciated that, apart from being located on the terminal side device, the memory 1620 may also be located at a geographical position different from the processor 1600.

In a possible embodiment of the present disclosure, the skipping a part of blind detection occasions within the specific time-domain range and performing the channel blind detection in the remaining blind detection occasions may include at least one of: skipping, by the terminal side device, a part of PDCCH candidates in at least one AL in search spaces within the specific time-domain range, and performing the channel blind detection on the remaining PDCCH candidates; skipping a part of search spaces within the specific time-domain range, and performing the channel blind detection in the remaining search spaces; or skipping search spaces in a part of CORESETs within the specific time-domain range, and performing the channel blind detection in search spaces in the remaining CORESETs.

In a possible embodiment of the present disclosure, a plurality of PDCCH monitoring occasions or a plurality of search space types may be provided within the specific time-domain range. The skipping a part of the search spaces within the specific time-domain range may include: continuously skipping search spaces in a part of the PDCCH monitoring occasions within the specific time-domain range in accordance with a chronological order of the monitoring occasions; or skipping, at intervals, the search spaces in a part of the PDCCH monitoring occasions within the specific time-domain range in accordance with the chronological order of the monitoring occasions.

In a possible embodiment of the present disclosure, the skipping, at intervals, the search spaces in a part of the PDCCH monitoring occasions within the specific time-domain range in accordance with the chronological order of the monitoring occasions may include: selecting, at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device may skip the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions may include: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the skipping the part of PDCCH candidates in at least one AL in the search spaces within the specific time-domain range may include: when there is a plurality of PDCCH candidates at each AL in each search space within the specific time-domain range, skipping a part of PDCCH candidates at each AL in each search space within the specific time-domain range sequentially until the quantity of times of blind detection to be performed within the specific time-domain range does not exceed the maximum blind detection capability; or when there is an AL with merely one PDCCH candidate in the specific time-domain range, skipping a part of PDCCH candidates at the other ALs in each search space within the specific time-domain range, the other ALs being ALs each with a plurality of PDCCH candidates; or skipping a part of PDCCH candidates at the ALs in each search space within the specific time-domain range in accordance with a specific order of the ALs until the quantity of times of blind detection to be performed by the terminal side device within the specific time-domain range does not exceed the maximum blind detection capability. In a procedure of skipping the PDCCH candidates, with respect to an AL with merely one PDCCH candidate left, the terminal side device stops skipping the PDCCH candidate at the AL.

In a possible embodiment of the present disclosure, the terminal side device may skip the PDCCH candidates in accordance with an order of the search space, the monitoring occasion and the AL until the remaining quantity of times of blind detection to be performed within the specific time-domain range does not exceed the maximum blind detection capability.

In a possible embodiment of the present disclosure, the skipping the part of search spaces within the specific time-domain range may include: skipping the part of search spaces within the specific time-domain range in accordance with a size of a monitoring period; or skipping the part of search spaces within the specific time-domain range in accordance with an RNTI; or skipping USSs in a specific CORESET, the specific CORESET being a CORESET for transmitting CSSs.

In a possible embodiment of the present disclosure, the skipping the search spaces in a part of CORESETs within the specific time-domain range may include: skipping the search spaces in a part of CORESETs within the specific time-domain in accordance with a mapping mode; or skipping search spaces in a specific CORESET within the specific time-domain range preferentially, the specific CORESET being a CORESET in a plurality of CORESETs whose QCL matches target QCL at a lowest matching level within the specific time-domain range, the target QCL being QCL acquired through beam management.

In a possible embodiment of the present disclosure, the skipping the search spaces in a part of CORESETs within the specific time-domain range in accordance with the mapping mode may include: skipping search spaces in localized mapping CORESETs within the specific time-domain range preferentially; or skipping search spaces in distributed-mapping CORESETs within the specific time-domain range preferentially.

In a possible embodiment of the present disclosure, the specific time-domain range may be a slot.

It should be appreciated that, the terminal side device may be the terminal side device in the above-mentioned method embodiments, and the terminal side device is capable of implementing the above-mentioned channel blind detection method with a same beneficial effect, which will not be particularly defined herein.

Figure 17:
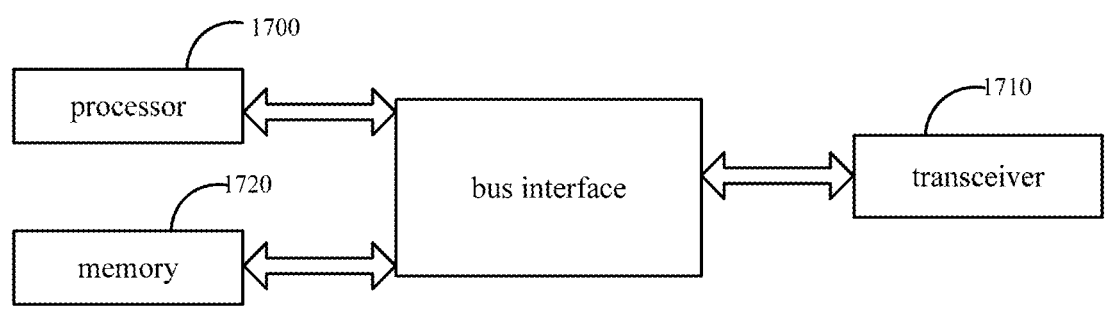
FIG. 17 is yet another schematic view showing the terminal side device according to one embodiment of the present disclosure.

The present disclosure further provides in some embodiments a network side device which, as shown in FIG. 17, includes a transceiver 1710, a memory 1720, a processor 1700, and a computer program stored in the memory 1720 and executed by the processor. The processor 1700 is configured to read and execute the computer program stored in the memory, so as to execute procedures of: when the quantity of times of blind detection to be performed by a terminal side device within a specific time-domain range exceeds a maximum blind detection capability, determining a part of blind detection occasions skipped by the terminal side device within the specific time-domain range, the maximum blind detection capability being a maximum quantity of times of blind detection performed by the terminal side device within the specific time-domain range; and transmitting signals in the remaining blind detection occasions, the remaining quantity of times of blind detection to be performed by the terminal side device within the specific time-domain range not exceeding the maximum blind detection capability. The transceiver 1710 is configured to receive and transmit data under the control of the processor 1700.

In FIG. 17, bus architecture may include a number of buses and bridges connected to each other, so as to connect various circuits for one or more processors 1700 and one or more memories 1720. In addition, as is known in the art, the bus architecture may be used to connect any other circuits, such as a circuit for a peripheral device, a circuit for a voltage stabilizer and a power management circuit. A bus interface may be provided, and the transceiver 1710 may consist of a plurality of elements, i.e., a transmitter and a receiver for communication with any other devices over a transmission medium.

The processor 1700 may take charge of managing the bus architecture as well as general processings. The memory 1720 may store therein data for the operation of the processor 1700.

It should be appreciated that, apart from being located on the terminal side device, the memory 1720 may also be located at a geographical position different from the processor 1700.

In a possible embodiment of the present disclosure, the determining the part of blind detection occasions to be skipped by the terminal side device within the specific time-domain range may include at least one of: determining a part of PDCCH candidates in at least one AL in search spaces skipped by the terminal side device within the specific time-domain range; determining a part of search spaces skipped by the terminal side device within the specific time-domain range; or determining search spaces in a part of CORESETs skipped by the terminal side device within the specific time-domain range.

In a possible embodiment of the present disclosure, a plurality of PDCCH monitoring occasions or a plurality of search space types may be provided within the specific time-domain range. The determining a part of search spaces skipped by the terminal side device within the specific time-domain range may include: determining search spaces in a part of the PDCCH monitoring occasions continuously skipped by the terminal side device within the specific time-domain range in accordance with a chronological order of the monitoring occasions; or determining the search spaces in a part of the PDCCH monitoring occasions skipped by the terminal side device at intervals within the specific time-domain range in accordance with the chronological order of the monitoring occasions.

In a possible embodiment of the present disclosure, the determining the search spaces in a part of the PDCCH monitoring occasions skipped by the terminal side device at intervals within the specific time-domain range in accordance with the chronological order of the monitoring occasions may include: selecting, at intervals, a part of the PDCCH monitoring occasions in a set of PDCCH monitoring occasions in accordance with a chronological order of the monitoring occasions, the set of PDCCH monitoring occasions selected for the first time including all PDCCH monitoring occasions within the specific time-domain range; when the quantity of times of blind detection to be performed by the terminal side device in the selected PDCCH monitoring occasions exceeds the maximum blind detection capability, or when the quantity of CCEs for the selected PDCCH monitoring occasions exceeds the maximum quantity of CCEs, taking a part of PDCCH monitoring occasions currently selected at intervals as the set of PDCCH monitoring occasions, and circularly performing the step of selecting, at intervals, a part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, a part of the PDCCH monitoring occasions in the set of PDCCH monitoring occasions. The terminal side device may skip the search spaces in the PDCCH monitoring occasions that are not selected.

In a possible embodiment of the present disclosure, a stopping condition for the selecting, at intervals, a part of the PDCCH monitoring occasions in the set of PDCCH monitoring occasions may include: that the quantity of times of blind detection to be performed in the selected PDCCH monitoring occasions is equal to the maximum blind detection capability and the quantity of CCEs is smaller than or equal to the maximum quantity of CCEs; or that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not include the part of PDCCH monitoring occasions currently selected at intervals; or that, when merely one PDCCH monitoring occasion is selected in the step of selecting, at intervals, the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not include the PDCCH monitoring occasion.

In a possible embodiment of the present disclosure, the determining a part of PDCCH candidates in at least one AL in the search spaces skipped by the terminal side device within the specific time-domain range may include: when there is a plurality of PDCCH candidates at each AL in each search space within the specific time-domain range, determining a part of PDCCH candidates at each AL in each search space skipped by the terminal side device within the specific time-domain range sequentially; or when there is an AL with merely one PDCCH candidate in the specific time-domain range, determining a part of PDCCH candidates at the other ALs in each search space skipped by the terminal side device within the specific time-domain range, the other ALs being ALs each with a plurality of PDCCH candidates; or determining a part of PDCCH candidates at the ALs in each search space skipped by the terminal side device within the specific time-domain range in accordance with a specific order of the ALs. In a procedure of skipping the PDCCH candidates, with respect to an AL with merely one PDCCH candidate left, the terminal side device stops skipping the PDCCH candidate at the AL.

In a possible embodiment of the present disclosure, the terminal side device may skip the PDCCH candidates in accordance with an order of the search space, the monitoring occasion and the AL until the remaining quantity of times of blind detection to be performed within the specific time-domain range does not exceed the maximum blind detection capability.

In a possible embodiment of the present disclosure, the determining a part of search spaces skipped by the terminal side device within the specific time-domain range may include: determining the part of search spaces skipped by the terminal side device within the specific time-domain range in accordance with a size of a monitoring period; or determining the part of search spaces skipped by the terminal side device within the specific time-domain range in accordance with an RNTI; or determining USSs skipped by the terminal side device in a specific CORESET, the specific CORESET being a CORESET for transmitting CSSs.

In a possible embodiment of the present disclosure, the determining the search spaces in a part of CORESETs skipped by the terminal side device within the specific time-domain range may include: determining the search spaces in a part of CORESETs skipped by the terminal side device within the specific time-domain in accordance with a mapping mode; or determining search spaces in a specific CORESET skipped preferentially by the terminal side device within the specific time-domain range, the specific CORESET being a CORESET in a plurality of CORESETs whose QCL matches target QCL at a lowest matching level within the specific time-domain range, the target QCL being QCL acquired through beam management.

In a possible embodiment of the present disclosure, the determining the search spaces in the part of CORESETs skipped by the terminal side device within the specific time-domain range in accordance with the mapping mode may include: determining search spaces in localized mapping CORESETs skipped by the terminal side device preferentially within the specific time-domain range; or determining search spaces in distributed-mapping CORESETs skipped by the terminal side device preferentially within the specific time-domain range.

In a possible embodiment of the present disclosure, the specific time-domain range may be a slot.

It should be appreciated that, the network side device in the embodiments of the present disclosure may be the network side device in the above method embodiments, and the network side device is capable of implementing the above-mentioned signal transmission method with a same technical effect, which will not be particularly defined herein.

The present disclosure further provides in some embodiments a computer-readable storage medium storing therein a computer program. The computer program is executed by a processor so as to implement the above-mentioned channel blind detection method or the above-mentioned signal transmission method.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A channel blind detection method, comprising:
   when a quantity of times of blind detection to be performed by a terminal side device within a specific time-domain range exceeds a maximum blind detection capability,
   skipping, by the terminal side device, a part of blind detection occasions within the specific time-domain range, and
   performing channel blind detection in a remaining blind detection occasions,
   wherein the maximum blind detection capability is a maximum quantity of times of blind detection performed by the terminal side device within the specific time-domain range, and
   a remaining quantity of times of blind detection to be performed by the terminal side device within the specific time-domain range does not exceed the maximum blind detection capability,
   wherein the skipping, by the terminal side device, the part of blind detection occasions within the specific time-domain range and performing the channel blind detection in the remaining blind detection occasions comprises:
   skipping, by the terminal side device, a part of search spaces within the specific time-domain range, and
   performing the channel blind detection in a remaining search spaces,
   wherein a plurality of PDCCH monitoring occasions or a plurality of search space types is provided within the specific time-domain range, and
   the skipping, by the terminal side device, the part of the search spaces within the specific time-domain range comprises:
   skipping at intervals, by the terminal side device, the search spaces in a part of the PDCCH monitoring occasions within the specific time-domain range in accordance with a chronological order of the monitoring occasions;
   wherein the skipping at intervals, by the terminal side device, the search spaces in the part of the PDCCH monitoring occasions within the specific time-domain range in accordance with the chronological order of the monitoring occasions comprises:
   selecting at intervals, by the terminal side device, the part of the PDCCH monitoring occasions in a set of PDCCH monitoring occasions in accordance with the chronological order of the monitoring occasions,
   the set of PDCCH monitoring occasions selected at intervals for a first time comprising
   all PDCCH monitoring occasions within the specific time-domain range;
   when the quantity of times of blind detection to be performed by the terminal side device in the selected PDCCH monitoring occasions exceeds the maximum blind detection capability, or
   when a quantity of Control Channel Elements (CCEs) for the selected PDCCH monitoring occasions exceeds a maximum quantity of CCEs, taking a part of PDCCH monitoring occasions currently selected at intervals as the set of PDCCH monitoring occasions, and circularly performing the step of selecting at intervals, the part of the PDCCH monitoring occasions in the set of PDCCH monitoring occasions; and
   when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting at intervals, the part of the PDCCH monitoring occasions in the set of PDCCH monitoring occasions, wherein the terminal side device skips the search spaces in the PDCCH monitoring occasions that are not selected.

2. The channel blind detection method according to claim 1, wherein the skipping, by the terminal side device, the part of the search spaces within the specific time-domain range further comprises: continuously skipping, by the terminal side device, search spaces in the part of the PDCCH monitoring occasions within the specific time-domain range in accordance with the chronological order of the monitoring occasions.

3. The channel blind detection method according to claim 1, wherein a stopping condition for the selecting at intervals, the part of the PDCCH monitoring occasions in the set of PDCCH monitoring occasions comprises: that
   the quantity of times of blind detection to be performed in the selected PDCCH monitoring occasions is equal to the maximum blind detection capability and the quantity of CCEs is smaller than or equal to the maximum quantity of CCEs; or
   that the quantity of CCEs in the selected PDCCH monitoring occasions is equal to the maximum quantity of CCEs and the quantity of times of blind detection to be performed is smaller than or equal to the maximum blind detection capability; or
   that the quantity of times of blind detection corresponding to all PDCCH candidates in the selected PDCCH monitoring occasions exceeds the maximum blind detection capability, or the quantity of CCEs exceeds the maximum quantity of CCEs, and
   PDCCH monitoring occasions monitored by the terminal side device do not comprise the part of PDCCH monitoring occasions currently selected at intervals; or
   that when merely one PDCCH monitoring occasion is selected in the step of selecting at intervals the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not comprise the PDCCH monitoring occasion.

4. The channel blind detection method according to claim 1, wherein the skipping, by the terminal side device, a part of PDCCH candidates in at least one Aggregation Level (AL) in the search spaces within the specific time-domain range comprises: when there is a plurality of PDCCH candidates at each AL in each search space within the specific time-domain range, skipping, by the terminal side device, the part of PDCCH candidates at each AL in each search space within the specific time-domain range sequentially until the quantity of times of blind detection to be performed within the specific time-domain range does not exceed the maximum blind detection capability; or when there is an AL with merely one PDCCH candidate in the specific time-domain range, skipping, by the terminal side device, a part of PDCCH candidates at the other ALs in each search space within the specific time-domain range, the other ALs being ALs each with the plurality of PDCCH candidates; or skipping, by the terminal side device, the part of PDCCH candidates at the ALs in each search space within the specific time-domain range in accordance with a specific order of the ALs until the quantity of times of blind detection to be performed by the terminal side device within the specific time-domain range does not exceed the maximum blind detection capability, wherein in a procedure of skipping the PDCCH candidates, with respect to an AL with merely one PDCCH candidate left, the terminal side device stops skipping the PDCCH candidate at the AL.

5. The channel blind detection method according to claim 4, wherein the terminal side device skips the PDCCH candidates in accordance with an order of the search space, the monitoring occasion and the AL until the remaining quantity of times of blind detection to be performed within the specific time-domain range does not exceed the maximum blind detection capability.

6. The channel blind detection method according to claim 1, wherein the skipping, by the terminal side device, the part of search spaces within the specific time-domain range further comprises: skipping, by the terminal side device, the part of search spaces within the specific time-domain range in accordance with a Radio Network Temporary Identity (RNTI); or skipping, by the terminal side device, UE-specific Search Spaces (USSs) in a specific Control Resource Set (CORESET), the specific CORESET being a CORESET for transmitting Common Search Spaces (CSSs).

7. The channel blind detection method according to claim 1, wherein the skipping, by the terminal side device, the search spaces in a part of Control Resource Sets (CORESETs) within the specific time-domain range comprises: skipping, by the terminal side device, the search spaces in the part of CORESETs within the specific time-domain in accordance with a mapping mode; or skipping, by the terminal side device, search spaces in a specific CORESET within the specific time-domain range preferentially, the specific CORESET being a CORESET in a plurality of CORESETs whose Quasi-Colocation (QCL) matches a target QCL at a lowest matching level within the specific time-domain range, the target QCL being QCL acquired through beam management, wherein the skipping, by the terminal side device, the search spaces in the part of CORESETs within the specific time-domain range in accordance with the mapping mode comprises: skipping, by the terminal side device, search spaces in localized mapping CORESETs within the specific time-domain range preferentially; or skipping, by the terminal side device, search spaces in distributed-mapping CORESETs within the specific time-domain range preferentially, wherein the specific time-domain range is a slot.

8. A non-transitory computer-readable storage medium storing therein a computer program, wherein the computer program is executed by a processor of a terminal side device, so as to implement the channel blind detection method according to claim 1.

9. A signal transmission method, comprising: when a quantity of times of blind detection to be performed by a terminal side device within a specific time-domain range exceeds a maximum blind detection capability, determining, by a network side device, a part of blind detection occasions skipped by the terminal side device within the specific time-domain range, the maximum blind detection capability being a maximum quantity of times of blind detection performed by the terminal side device within the specific time-domain range; and transmitting, by the network side device, signals in a remaining blind detection occasions, wherein a remaining quantity of times of blind detection to be performed by the terminal side device within the specific time-domain range does not exceed the maximum blind detection capability, wherein the determining, by the network side device, the part of blind detection occasions to be skipped by the terminal side device within the specific time-domain range comprises: determining, by the network side device, a part of search spaces skipped by the terminal side device within the specific time-domain range, wherein a plurality of PDCCH monitoring occasions or a plurality of search space types is provided within the specific time-domain range, and the determining, by the network side device, the part of search spaces skipped by the terminal side device within the specific time-domain range comprises:

determining, by the network side device, the search spaces in a part of the PDCCH monitoring occasions skipped by the terminal side device at intervals within the specific time-domain range in accordance with a chronological order of the monitoring occasions, wherein the determining, by the network side device, the search spaces in the part of the PDCCH monitoring occasions skipped by the terminal side device at intervals within the specific time-domain range in accordance with the chronological order of the monitoring occasions comprises: selecting at intervals, by the network side device, the part of the PDCCH monitoring occasions in a set of PDCCH monitoring occasions in accordance with the chronological order of the monitoring occasions, the set of PDCCH monitoring occasions selected for a first time comprising all PDCCH monitoring occasions within the specific time-domain range;

when the quantity of times of blind detection to be performed by the terminal side device in the selected PDCCH monitoring occasions exceeds the maximum blind detection capability, or when a quantity of Control Channel Elements (CCEs for the selected PDCCH monitoring occasions exceeds a maximum quantity of CCEs, taking a part of PDCCH monitoring occasions currently selected at intervals as the set of PDCCH monitoring occasions, and circularly performing the step of selecting, at intervals, the part of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting, at intervals, the part of the PDCCH monitoring occasions in the set of PDCCH monitoring occasions, wherein the terminal side device skips the search spaces in the PDCCH monitoring occasions that are not selected.

10. The signal transmission method according to claim 9, wherein the determining, by the network side device, the part of search spaces skipped by the terminal side device within the specific time-domain range further comprises: determining, by the network side device, search spaces in the part of the PDCCH monitoring occasions continuously skipped by the terminal side device within the specific time-domain range in accordance with the chronological order of the monitoring occasions.

11. The signal transmission method according to claim 9, wherein a stopping condition for the selecting, at intervals, the part of the PDCCH monitoring occasions in the set of PDCCH monitoring occasions comprises:
   that the quantity of times of blind detection to be performed in the selected PDCCH monitoring occasions is equal to the maximum blind detection capability and the quantity of CCEs is smaller than or equal to the maximum quantity of CCEs; or
   that the quantity of CCEs in the selected PDCCH monitoring occasions is equal to the maximum quantity of CCEs and the quantity of times of blind detection to be performed is smaller than or equal to the maximum blind detection capability; or that the quantity of times of blind detection corresponding to all PDCCH candidates in the selected PDCCH monitoring occasions exceeds the maximum blind detection capability, or the quantity of CCEs exceeds the maximum quantity of CCEs, and PDCCH monitoring occasions monitored by the terminal side device do not comprise the part of PDCCH monitoring occasions currently selected at intervals; or that, when merely one PDCCH monitoring occasion is selected in the step of selecting at intervals the part of PDCCH monitoring occasions in the set of PDCCH monitoring occasions, the quantity of times of blind detection to be performed in the selected PDCCH monitoring occasions exceeds the maximum blind detection capability or the quantity of CCEs exceeds the maximum quantity of CCEs, and PDCCH monitoring occasions monitored by the terminal side device do not comprise the PDCCH monitoring occasion.

12. The signal transmission method according to claim 9, wherein
   the determining, by the network side device, a part of PDCCH candidates in at least one Aggregation Level (AL) in the search spaces skipped by the terminal side device within the specific time-domain range comprises: when there is a plurality of PDCCH candidates at each AL in each search space within the specific time-domain range, determining, by the network side device, the part of PDCCH candidates at each AL in each search space skipped by the terminal side device within the specific time-domain range sequentially; or
   when there is an AL with merely one PDCCH candidate in the specific time-domain range, determining, by the network side device, a part of PDCCH candidates at the other ALs in each search space skipped by the terminal side device within the specific time-domain range, the other ALs being ALs each with the plurality of PDCCH candidates; or
   determining, by the network side device, the part of PDCCH candidates at the ALs in each search space skipped by the terminal side device within the specific time-domain range in accordance with a specific order of the ALs,
   wherein in a procedure of skipping the PDCCH candidates, with respect to an AL with merely one PDCCH candidate left, the terminal side device stops skipping the PDCCH candidate at the AL.

13. The signal transmission method according to claim 12, wherein the terminal side device skips the PDCCH candidates in accordance with an order of the search space, the monitoring occasion and the AL until the remaining quantity of times of blind detection to be performed within the specific time-domain range does not exceed the maximum blind detection capability.

14. The signal transmission method according to claim 9, wherein the determining, by the network side device, the part of search spaces skipped by the terminal side device within the specific time-domain range further comprises:
   determining, by the network side device, the part of search spaces skipped by the terminal side device within the specific time-domain range in accordance with Radio Network Temporary Identity (RNTI); or
   determining, by the network side device, UE-specific Search Spaces (USSs) skipped by the terminal side device in a specific Control Resource Set (CORESET), the specific CORESET being a CORESET for transmitting Common Search Spaces (CSSs.

15. The signal transmission method according to claim 9, wherein the determining, by the network side device, search spaces in a part of Control Resource Sets (CORESETs) skipped by the terminal side device within the specific time-domain range comprises:
   determining, by the network side device, the search spaces in the part of CORESETs skipped by the terminal side device within the specific time-domain in accordance with a mapping mode; or
   determining, by the network side device, search spaces in a specific CORESET skipped preferentially by the terminal side device within the specific time-domain range, the specific CORESET being a CORESET in a plurality of CORESETs whose Quasi-Colocation (QCL) matches a target QCL at a lowest matching level within the specific time-domain range, the target QCL being QCL acquired through beam management,
   wherein the determining, by the network side device, the search spaces in the part of CORESETs skipped by the terminal side device within the specific time-domain range in accordance with the mapping mode comprises:
   determining, by the network side device, search spaces in localized mapping CORESETs skipped by the terminal side device preferentially within the specific time-domain range; or determining, by the network side device, search spaces in distributed-mapping CORESETs skipped by the terminal side device preferentially within the specific time-domain range, wherein the specific time-domain range is a slot.

16. A network side device, comprising a transceiver, a memory, a processor, and a computer program stored in the memory and executed by the processor, wherein the processor is configured to read and execute the computer program stored in the memory, so as to execute procedures of the signal transmission method according to claim 9.

17. A non-transitory computer-readable storage medium storing therein a computer program, wherein the computer program is executed by a processor of a network side device, so as to implement the signal transmission method according to claim 9.

18. A terminal side device, comprising a transceiver, a memory, a processor, and a computer program stored in the memory and executed by the processor, wherein the processor is configured to read and execute the computer program stored in the memory, so as to execute a procedure of: when a quantity of times of blind detection to be performed by a terminal side device within a specific time-domain range exceeds a maximum blind detection capability, skipping a part of blind detection occasions within the specific time-domain range, and performing channel blind detection in a remaining blind detection occasions, wherein the maximum blind detection capability is a maximum quantity of times of blind detection performed by the terminal side device within the specific time-domain range, and a remaining quantity of times of blind detection to be performed by the terminal side device within the specific time-domain range does not exceed the maximum blind detection capability, wherein the skipping, by the terminal side device, the part of blind detection occasions within the specific time-domain range and performing the channel blind detection in the remaining blind detection occasions comprises: skipping, by the terminal side device, a part of search spaces within the specific time-domain range, and performing the channel blind detection in a remaining search spaces, wherein a plurality of PDCCH monitoring occasions or a plurality of search space types is provided within the specific time-domain range, and the skipping, by the terminal side device, the part of the search spaces within the specific time-domain range comprises:

skipping at intervals, by the terminal side device, the search spaces in a part of the PDCCH monitoring occasions within the specific time-domain range in accordance with a chronological order of the monitoring occasions, wherein the skipping at intervals, by the terminal side device, the search spaces in the part of the PDCCH monitoring occasions within the specific time-domain range in accordance with the chronological order of the monitoring occasions comprises:

selecting at intervals, by the terminal side device, the part of the PDCCH monitoring occasions in a set of PDCCH monitoring occasions in accordance with the chronological order of the monitoring occasions, the set of PDCCH monitoring occasions selected at intervals for a first time comprising all PDCCH monitoring occasions within the specific time-domain range;

when the quantity of times of blind detection to be performed by the terminal side device in the selected PDCCH monitoring occasions exceeds the maximum blind detection capability, or when a quantity of Control Channel Elements (CCEs) for the selected PDCCH monitoring occasions exceeds a maximum quantity of CCEs, taking a part of PDCCH monitoring occasions currently selected at intervals as the set of PDCCH monitoring occasions, and circularly performing the step of selecting at intervals, the of the PDCCH monitoring occasions in the set of PDCCH monitoring occasions; and when the quantity of times of blind detection to be performed by the terminal side device in the selected PDCCH monitoring occasions is smaller than the maximum blind detection capability and the quantity of CCEs is smaller than the maximum quantity of CCEs, taking PDCCH monitoring occasions not selected in a current set of PDCCH monitoring occasions as the set of PDCCH monitoring occasions, and circularly preforming the step of selecting at intervals, the part of the PDCCH monitoring occasions in the set of PDCCH monitoring occasions, wherein the terminal side device skips the search spaces in the PDCCH monitoring occasions that are not selected.

19. The terminal side device according to claim 18, wherein the skipping, by the terminal side device, the part of the search spaces within the specific time-domain range further comprises: continuously skipping, by the terminal side device, search spaces in the part of the PDCCH monitoring occasions within the specific time-domain range in accordance with the chronological order of the monitoring occasions.

20. The terminal side device according to claim 18, wherein the skipping, by the terminal side device, the search spaces in a part of Control Resource Sets (CORESETs) within the specific time-domain range comprises:

skipping, by the terminal side device, the search spaces in the part of CORESETs within the specific time-domain in accordance with a mapping mode; or skipping, by the terminal side device, search spaces in a specific CORESET within the specific time-domain range preferentially, the specific CORESET being a CORESET in a plurality of CORESETs whose Quasi-Colocation (QCL) matches a target QCL at a lowest matching level within the specific time-domain range, the target QCL being QCL acquired through beam management, wherein the skipping, by the terminal side device, the search spaces in the part of CORESETs within the specific time-domain range in accordance with the mapping mode comprises:

skipping, by the terminal side device, search spaces in localized mapping CORESETs within the specific time-domain range preferentially; or skipping, by the terminal side device, search spaces in distributed-mapping CORESETs within the specific time-domain range preferentially, wherein the specific time-domain range is a slot.

* * * * *